United States Patent
Fujii et al.

(10) Patent No.: US 7,349,016 B2
(45) Date of Patent: Mar. 25, 2008

(54) SOLID-STATE COLOR IMAGING APPARATUS CAPABLE OF REDUCING FALSE SIGNALS WITH REGARD TO BOTH LUMINANCE AND CHROMINANCE

(75) Inventors: Toshiya Fujii, Shiga (JP); Takahiro Iwasawa, Kyoto (JP); Takumi Yamaguchi, Kyoto (JP); Takahiko Murata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 856 days.

(21) Appl. No.: 10/814,347

(22) Filed: Apr. 1, 2004

(65) Prior Publication Data
US 2004/0196396 A1 Oct. 7, 2004

(30) Foreign Application Priority Data
Apr. 3, 2003 (JP) .............................. 2003-100187

(51) Int. Cl.
*H04N 3/14* (2006.01)
*H04N 5/335* (2006.01)

(52) U.S. Cl. .................... 348/277; 348/282; 348/312

(58) Field of Classification Search ................ 348/277
See application file for complete search history.

(56) References Cited

U.S. PATENT DOCUMENTS 6,583,809 B1 * 6/2003 Fujiwara .................. 348/14.12
6,678,000 B1 * 1/2004 Sakata ......................... 348/369
6,686,960 B2   2/2004 Iizuka
7,148,926 B2 * 12/2006 Morinaka et al. ............ 348/277
2003/0133028 A1 * 7/2003 Morinaka et al. ............ 348/273
2004/0062454 A1 * 4/2004 Komiya et al. ............. 382/284
2004/0207747 A1 * 10/2004 Ikeda ......................... 348/335
2006/0227225 A1 * 10/2006 Watanabe ................. 348/240.2

FOREIGN PATENT DOCUMENTS

| JP | 2000-261814 | 9/2000 |
|---|---|---|
| JP | P2001-36920 A | 2/2001 |
| JP | 2001-078081 | 3/2001 |
| JP | P2001-292453 A | 10/2001 |
| JP | 2003-052048 | 2/2003 |

* cited by examiner

*Primary Examiner*—Lin Ye
*Assistant Examiner*—Hung Lam
(74) *Attorney, Agent, or Firm*—McDermott Will & Emery LLP

(57) ABSTRACT

A pixel area of a megapixel solid-state color imaging device is divided into unit areas for pixel adding and all the pixels for the same color are added together in each unit area. Accordingly, the percentage of utilized pixels is raised to 100% and aliasing noise to low frequencies in a high-frequency video signal is greatly suppressed by a spatial LPF (low pass filter) effect of the pixel addition in the area units.

16 Claims, 15 Drawing Sheets

Y PIXEL WEIGHT CENTER ARRANGEMENT IN OUTPUT OF FILTER 92 FOR CORRECTING WEIGHT CENTER IRREGULARITY

SOLID-STATE COLOR IMAGING APPARATUS CAPABLE OF REDUCING FALSE SIGNALS WITH REGARD TO BOTH LUMINANCE AND CHROMINANCE

BACKGROUND OF THE INVENTION

The present invention relates to solid-state color imaging apparatus such as a digital still camera or a digital video camera.

Solid-state imaging devices for converting incident light into an electric signal and outputting the signal as an image signal have been previously known, and cameras such as a digital still camera for displaying the image signal obtained by such a solid-state imaging device as a still image have been also known. In recent years, cameras using such solid-state imaging devices have been required to have their image qualities and functions further improved, and the number of pixels used therein has been increased rapidly.

In a solid-state imaging device having about 5 million pixels, for example, about 1920 pixels are provided in the vertical direction and about 2560 pixels are provided in the horizontal direction. The number of pixels of this device is about 16 times as large as that of a general NTSC (national television system committee) solid-state imaging device and the frame rate thereof when all the pixels are output is about a half second if a conventional pixel clock of about 12 MHz is used. Therefore, in many cases, the solid-state imaging device cannot output an image signal to a display (e.g., a liquid-crystal monitor) of a camera without a change in frame rate.

In view of this, in such a solid-state imaging device, a driving method for reading an image signal at high speed by decimating (thinning out) pixels from which signals are read out in the vertical direction as well as increasing the speed of pixel clocks has been conventionally used. In this method, only signals of pixels on two out of eight lines, for example, are used.

However, in this pixel decimation method, pixels are resampled extremely (to one-fourth in the above example) in the vertical direction and no associated spatial LPF (low pass filter) used for this resampling is present in the vertical direction. Accordingly, if a picture whose video signal contains high-frequency signals in the vertical direction is captured, a large amount of aliasing of a high-frequency component in the vertical direction appears as low frequencies. This causes not only the problem of a large number of false signals in both of luminance (Y) signals and chrominance (C) signals but also the problem of large decrease in the vertical resolution with respect to the horizontal resolution caused by an imbalance in pixel sampling density between the horizontal direction and the vertical direction. In addition, since signals of pixels on lines from which no data is read out are discarded, there also arises another problem that substantial sensitivity decreases. The percentage of utilized pixels in the above example is 25%.

As the number of pixels in a solid-state imaging device increases, all the foregoing problems inherently tend to be more noticeable with the conventional method. This is because the ratio of lines used for vertical readout to all the lines in the solid-state imaging device needs to be reduced in order to increase the frame rate.

In Japanese Laid-Open Publication No. 2001-36920, disclosed is a technique for reducing the number of pixels in the output of a solid-state imaging device by adding pixels together. However, with this technique, pixels which are not a target of the pixel addition are present in an effective area in the solid-state imaging device, so that high-sensitivity imaging is not achieved. In addition, pixels reduced in number for respective colors and obtained by the addition are irregularly arranged, resulting in defects in the image.

SUMMARY OF THE INVENTION

It is therefore an object of the present invention to reduce the number of pixels output from a solid-state imaging device having a large number of pixels such as an ultra megapixel solid-state imaging device by utilizing a pixel adding technique for taking pictures at high speed with low power consumption, high sensitivity and high image quality (i.e., with high-frequency aliasing noise suppressed), thus allowing an ultra megapixel solid-state imaging device to pickup moving images.

In order to achieve this object, a first solid-state color imaging apparatus according to the present invention comprises: a solid-state imaging device including a plurality of photoelectric converters arranged in an array and color filters attached to front faces of the respective photoelectric converters. The color filters are repeatedly arranged in two dimensions, and p×q pixels (where p is a natural number and q is a natural number) in the solid-state imaging device in which p pixels are arranged in a horizontal direction and q pixels are arranged in a vertical direction form a basic unit of a pixel adding area. The first inventive solid-state color imaging apparatus further comprises: means configured to have an arrangement in which all the basic units of the pixel adding area are repeatedly arranged in two dimensions, being shifted from each other in the horizontal and vertical directions and overlapping with each other; and means for adding together all the pixels corresponding to part of the color filters for the same color in each of the basic units of the pixel adding area.

A second solid-state color imaging apparatus according to the present invention comprises: a solid-state imaging device including a plurality of photoelectric converters arranged in an array and color filters attached to front faces of the respective photoelectric converters. The color filters are repeatedly arranged in two dimensions in the manner that, if one direction is defined as a row and another direction perpendicular to said direction is defined as a column, four rows and two columns form one unit of the color filter arrangement in which one of the color filters at the first row and the first column and one of the color filters at the third row and the second column are for the same color, one of the color filters at the first row and the second column and one of the color filters at the third row and the first column are for the same color, one of the color filters at the second row and the first column and one of the color filters at the fourth row and the second column are for the same color and one of the color filters at the second row and the second column and one of the color filters at the fourth row and the first column are for the same color. One basic unit of a pixel adding area is constituted by p×q pixels (where p=2n+2, n is a natural number, q=2 m+2 and m is a natural number) in the solid-state imaging device in which p pixels are arranged in a horizontal direction and q pixels are arranged in a vertical direction. The inventive second solid-state color imaging apparatus further comprises: means for adding together all the pixels for a color represented by one of the color filters at the first row and the first column and one of the color filters at the third row and the second column in the unit of the color filter arrangement; means for adding together all the pixels for a color represented by one of the color filters at the first row and the second column and one of the color filters at the third row and the first column in the unit of the color filter arrangement; means for adding all the pixels for a color represented by one of the color filters at the second row and the first column and one of the color filters at the fourth row and the second column in the unit of the color filter arrangement; and means for adding all the pixels for a color represented by one of the color filters at the second row and the second column and one of the color filters at the fourth row and the first column in the unit of the color filter arrangement.

The first solid-state color imaging apparatus achieves spatial resampling in two dimensions in both the horizontal and vertical directions where pre-LPF is present by adding pixels. In addition, even in a case where the number of pixels used in the solid-state imaging device increases, if the image adding area for enhancing the frame rate is enlarged in the vertical and horizontal directions depending on purposes, an optimum number of output pixels are selected.

All the pixels in an effective area of the solid-state imaging device may be targets of pixel additions. Then, all the pixels can be output by the pixel additions without being discarded, thus greatly enhancing the sensitivity. According to the present invention, the percentage of utilized pixels is 100%.

Basic units of the pixel adding area may be arranged to overlap with each other such that the resultant pixels reduced in number and obtained by the addition are regularly arranged. Then, even if an image whose video signal includes high-frequency signals in both the horizontal and vertical directions is captured, aliasing of a high-frequency component appearing as low frequencies is greatly reduced and false signals in both of luminance signals and chrominance signals are largely suppressed and, in addition, the image sampling densities in the horizontal and vertical directions are perfectly balanced. Accordingly, it is possible to set the horizontal resolution and the vertical resolution exactly equal to each other.

The second solid-state color imaging apparatus reduces the number of output pixels in capturing a moving image by an ultra megapixel solid-state imaging device, as compared to the first solid-state color imaging apparatus. As a result, the second solid-state color imaging apparatus has a great effect in reducing the number of pixels to a necessary number while maintaining high image quality.

DESCRIPTION OF THE PREFERRED EMBODIMENTS

Hereinafter, first through fifth embodiments of a solid-state color imaging apparatus according to the present invention will be described with reference to the drawings. In the embodiments, a CCD (charge-coupled device) solid-state imaging device is used. Alternatively, the imaging device may be a solid-state imaging device of MOS (metal-oxide semiconductor) type.

Embodiment 1

Figure 1:
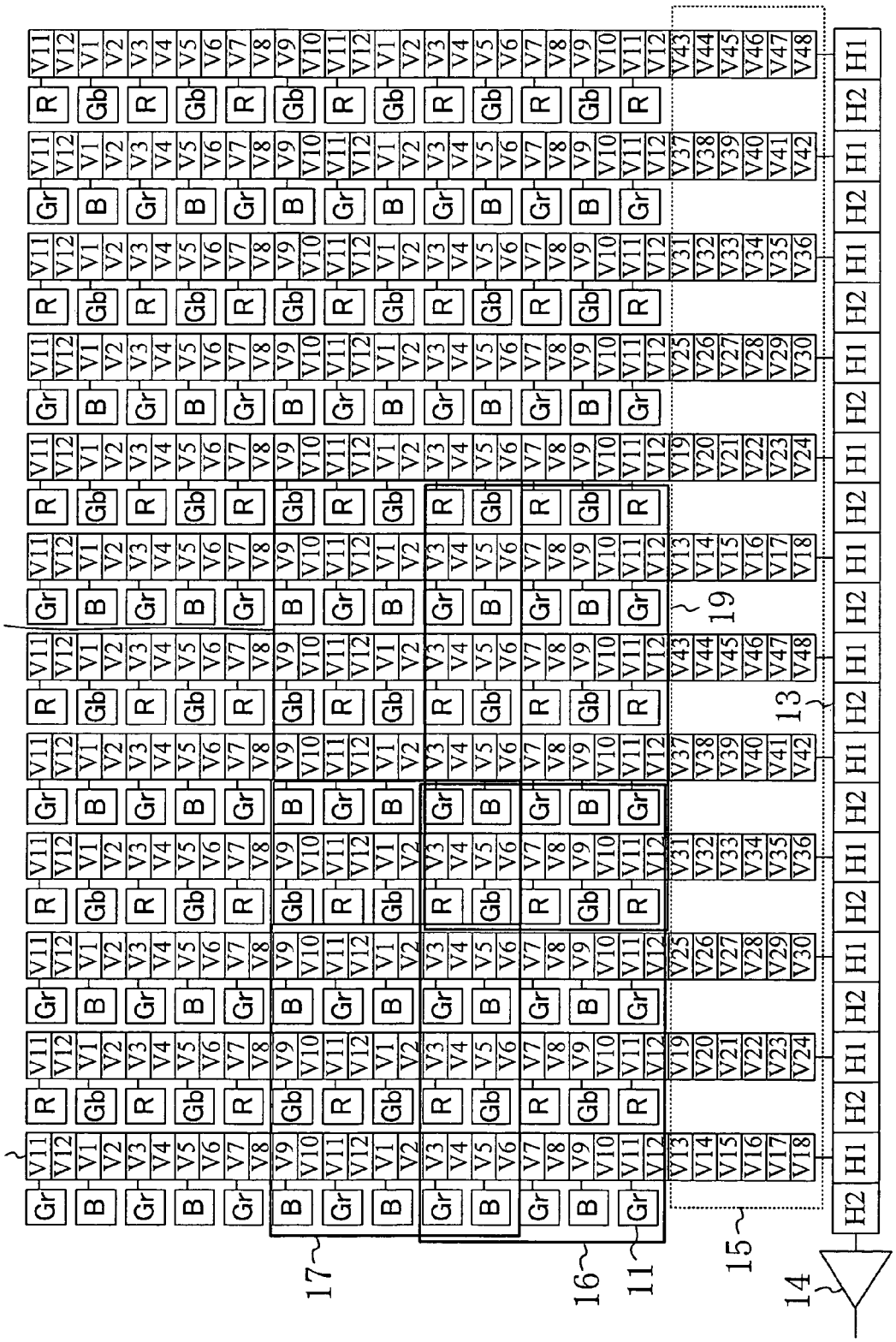
FIG. 1 is a diagram showing a configuration of a CCD solid-state imaging device according to a first embodiment of the present invention.

FIG. 1 is a diagram showing a configuration of a CCD solid-state imaging device according to a first embodiment of the inventive solid-state color imaging apparatus. Reference numeral 11 denotes a photoelectric converter and a color filter attached to the front face thereof. In this embodiment, color filters each for red (R), green (G) or blue (B) are adopted and are arranged in the manner of a Bayer arrangement, for example. Though Gr and Gb are actually the same color (green), filter pixels horizontally sandwiched between R filters are shown as Gr and filter pixels horizontally sandwiched between B filters are shown as Gb for convenience in describing operation. Reference numeral 12 denotes a vertical transfer stage in 12 phases constituted by V1 through V12. Reference numeral 13 denotes a horizontal transfer stage in two phases constituted by H1 and H2. Reference numeral 14 denotes an output amplifier. Reference numeral 15 denotes a vertical-horizontal transfer control section which is an extension of the 12-phase vertical transfer stage 12 constituted by V1 through V12, has its gates independently wired, and is constituted by V13 through V48. Reference numeral 16 denotes a basic unit of a pixel adding area for Gr. Reference numeral 17 denotes a basic unit of a pixel adding area for B. Reference numeral 18 denotes a basic unit of a pixel adding area for Gb. Reference numeral 19 denotes a basic unit of a pixel adding area for R. Each of the basic units 16 through 19 of the respective pixel adding areas is made of pixels arranged in five rows and five columns.

The vertical transfer stage 12 performs a basic transfer in a six-phase mode. However, for convenience in pixel addition, V constitutes 12 phases and is independently wired. First, signal charges of pixels corresponding to the photoelectric converters Gr and R connected to V3 and the photoelectric converters B and Gb connected to V9 are read out to the vertical transfer stage 12 by applying photoelectric-converter readout pulses to the gates of V3 and V9. The readout signal charges are transferred in a normal six-phase mode in the vertical transfer stage 12 in a direction to the bottom of the drawing sheet. When the charges for Gr and R in the vertical transfer stage 12 proceed by four stages to be transferred to portions under the gates of V7 and the charges for B and Gb in the vertical transfer stage 12 are transferred to portions under the gates of V1, photoelectric-converter readout pulses are applied to the gates of V7 and V1, so that pixels connected to V7 and V1 are read out to the vertical transfer stage 12. In this manner, pixels for the same color are added together in groups of two in the vertical transfer stage 12. Then, the charges are further transferred in a normal six-phase mode in the vertical transfer stage 12 in a direction to the bottom of the drawing sheet. When the charges for Gr and R in the vertical transfer stage 12 proceed by four stages to be transferred to portions under the gates of V11 and the charges for B and Gb in the vertical transfer stage 12 are transferred to portions under the gates of V5, photoelectric-converter readout pulses are applied to the gates of V11 and V5 in the same manner, so that pixels connected to V11 and V5 are readout to the vertical transfer stage 12. In this manner, pixels for the same color are added together in groups of three in the vertical transfer stage 12.

At this time, the vertical-horizontal transfer control section 15 drives all the gates of V13 through V48 in a normal six-phase mode as in the vertical transfer stage 12, so that signal charges for Gr and R subjected to the three-pixel addition are accumulated in the vertical-horizontal transfer control section 15. Then, only V37 through V42 and V19 through V24 in the vertical-horizontal transfer control section 15 are operated by normal six-phase driving, so that only signal charges for Gr and R in the respective columns including V42 and V24 are transferred to the horizontal transfer stage 13. Subsequently, the horizontal transfer stage 13 performs two-stage transfer in a normal two-phase driving mode. Thereafter, only V25 through V30 and V43 through V48 in the vertical-horizontal transfer control section 15 are operated by normal six-phase driving, so that only signal charges for Gr and R in the respective columns including V30 and V48 are transferred to the horizontal transfer stage 13 and are added to signal charges for the respective same colors in the horizontal transfer stage 13. In this manner, signal charges of pixels for each of Gr and R are added together in groups of a total of six in the horizontal transfer stage 13. Further, the horizontal transfer stage 13 performs two-stage transfer in a normal two-phase driving mode, and then only V13 through V18 and V31 through V36 in the vertical-horizontal transfer control section 15 are operated by normal six-phase driving, so that only signal charges for Gr and R in the respective columns including V18 and V36 are transferred to the horizontal transfer stage 13 and are added to signal charges for the respective same colors in the horizontal transfer stage 13. In this manner, signal charges of pixels for each of Gr and R are added together in groups of a total of nine in the horizontal transfer stage 13. Subsequently, the horizontal transfer stage 13 is operated by normal two-phase driving, so that the solid-state imaging device outputs signals for respective Gr and R in which pixels are added together in groups of nine, via the output amplifier 14.

The foregoing series of operation is repeated so that the solid-state imaging device outputs signals for respective B and Gb in which pixels are added together in groups of nine.

Figure 2:
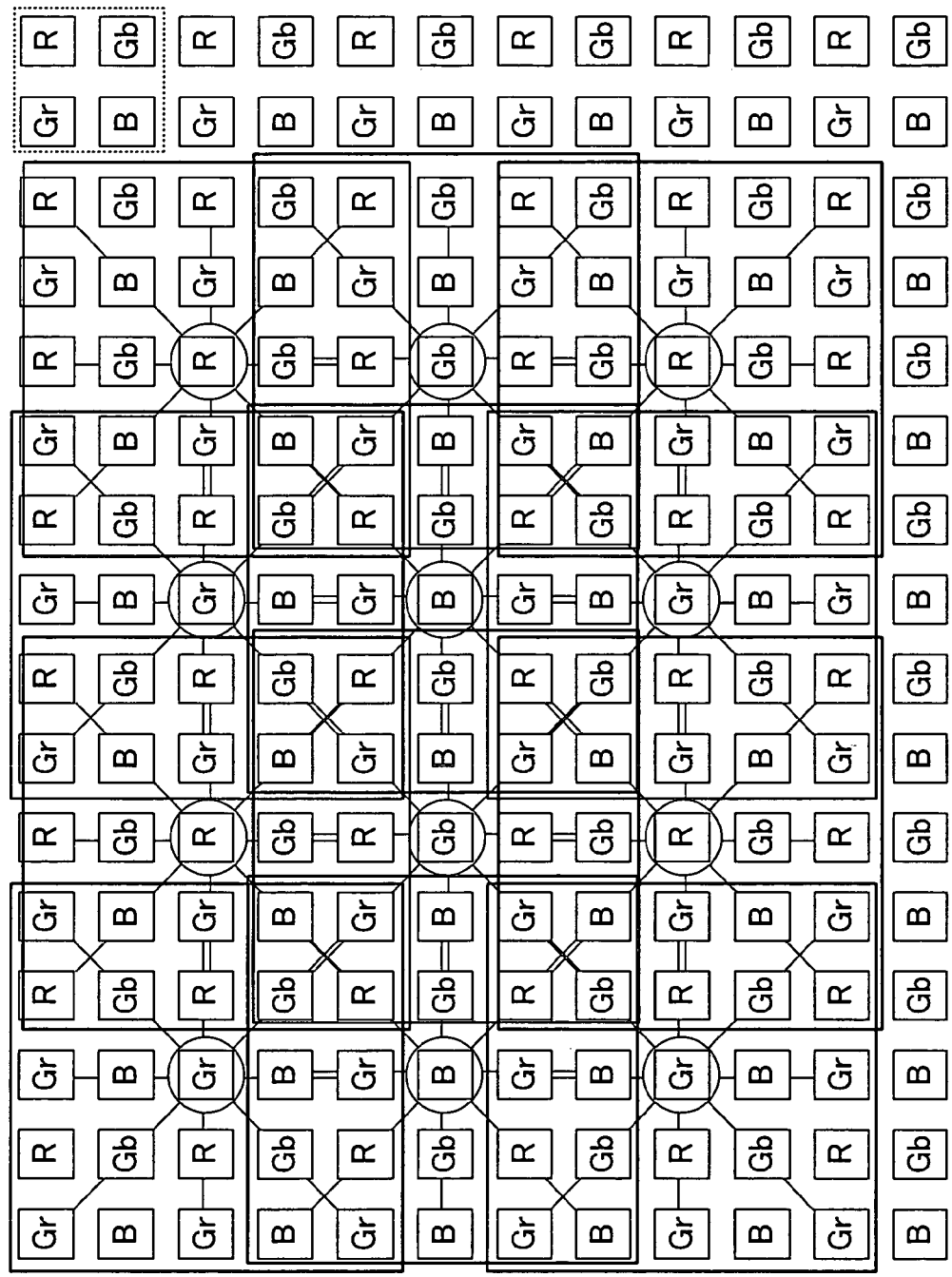
FIG. 2 is a diagram showing a pixel added pattern image in a Bayer arrangement according to the first embodiment.

As is apparent from the foregoing description, all the nine pixels for Gr in the Gr pixel adding area unit 16 are added together, all the nine pixels for R in the R pixel adding area unit 19 are added together, all the nine pixels for B in the B pixel adding area unit 17 are added together, and all the nine pixels for Gb in the Gb pixel adding area unit 18 are added together. Then, the resultant pixels are output. FIG. 2 shows a pixel added pattern image which is output with this technique.

As shown in FIG. 2, the position of a resultant pixel obtained by the nine-pixel addition coincides with the center of a basic unit of a pixel adding area, and basic units of pixel adding areas are arranged regularly, overlapping with each other in two pixels in each direction. In addition, the resultant pixels obtained by the nine-pixel additions are also arranged in the manner of a Bayer arrangement. Further, it is shown that the percentage of utilized pixels is 100%.

Figure 3:
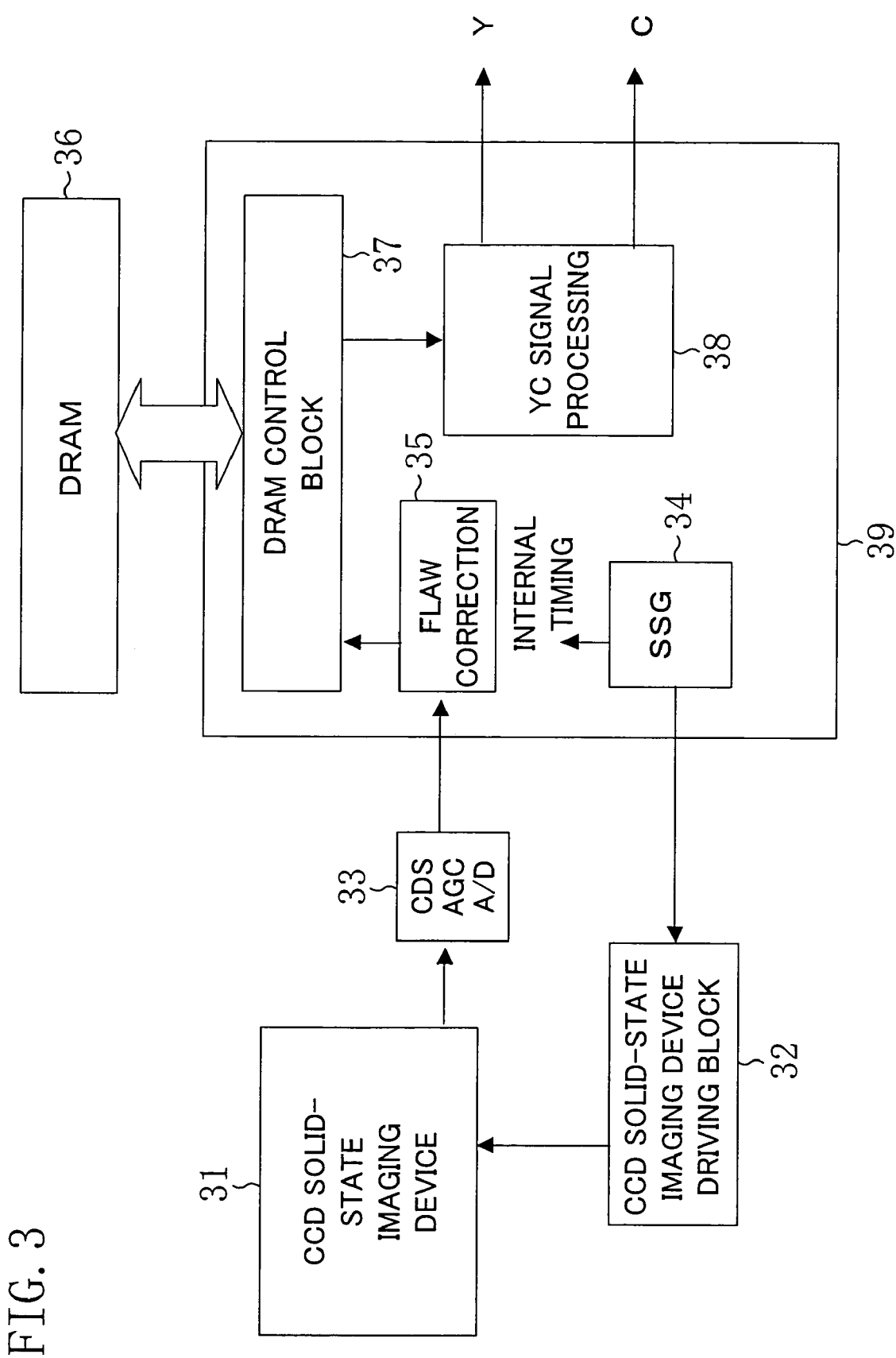
FIG. 3 is diagram showing an imaging system for use in embodiments of the present invention.

FIG. 3 is a system block diagram according to the first embodiment. Reference numeral 31 denotes the CCD solid-state imaging device shown in FIG. 1, reference numeral 32 denotes a CCD solid-state imaging device driving block, reference numeral 33 denotes a CDS (correlated double sampling) AGC (automatic gain control) A/D (analog-to-digital) converter of a camera analog front end, reference numeral 34 denotes a system timing SSG (sync signal generator) block, reference numeral 35 denotes a DRAM (dynamic random access memory) storage preparation block for, for example, CCD flaw correction, reference numeral 36 denotes a DRAM, reference numeral 37 denotes a DRAM control block, reference numeral 38 denotes a YC signal processing block and reference numeral 39 denotes a total block for camera signal processing.

In the output of the solid-state imaging device of the first embodiment, the resultant pixels obtained by the pixel additions spatially represent an ordinary Bayer arrangement at a uniform density in two dimensions even in a mixing mode as described above.

The CCD solid-state imaging device 31 is driven by the above-described driving method utilizing timing generation of the CCD solid-state imaging driving block 32, thereby obtaining an output in which pixels are added together in groups of nine. At this time, the addition driving allows the output to be produced at regular intervals with respect to the timing of clocks. The output signal is converted into a digital signal by the camera analog front end 33 and is subjected to flaw correction in the DRAM storage preparation block 35. Then, the output of the device is subjected to the regular-interval timing correction in the DRAM control block 37 and then is temporally stored in the DRAM 36. The stored data represents a perfect Bayer arrangement in which the number of pixels is reduced to one-ninth, so that an ordinary Bayer process is performed as subsequent processes. The CCDRAW data in the DRAM 36 is converted into a YC signal, if required, in the YC signal processing block 38 and is output from the inventive apparatus.

If V1 through V12 are changed to be operated at the timing of a general 3:1-interlaced all-pixel readout mode, V13 through V48 are operated by general six-phase driving and the regular-interval correction is not performed on the signal processing timing, only a change of the timing enables switching between the pixel adding mode and the 3:1-interlaced all-pixel readout mode.

Figure 4:
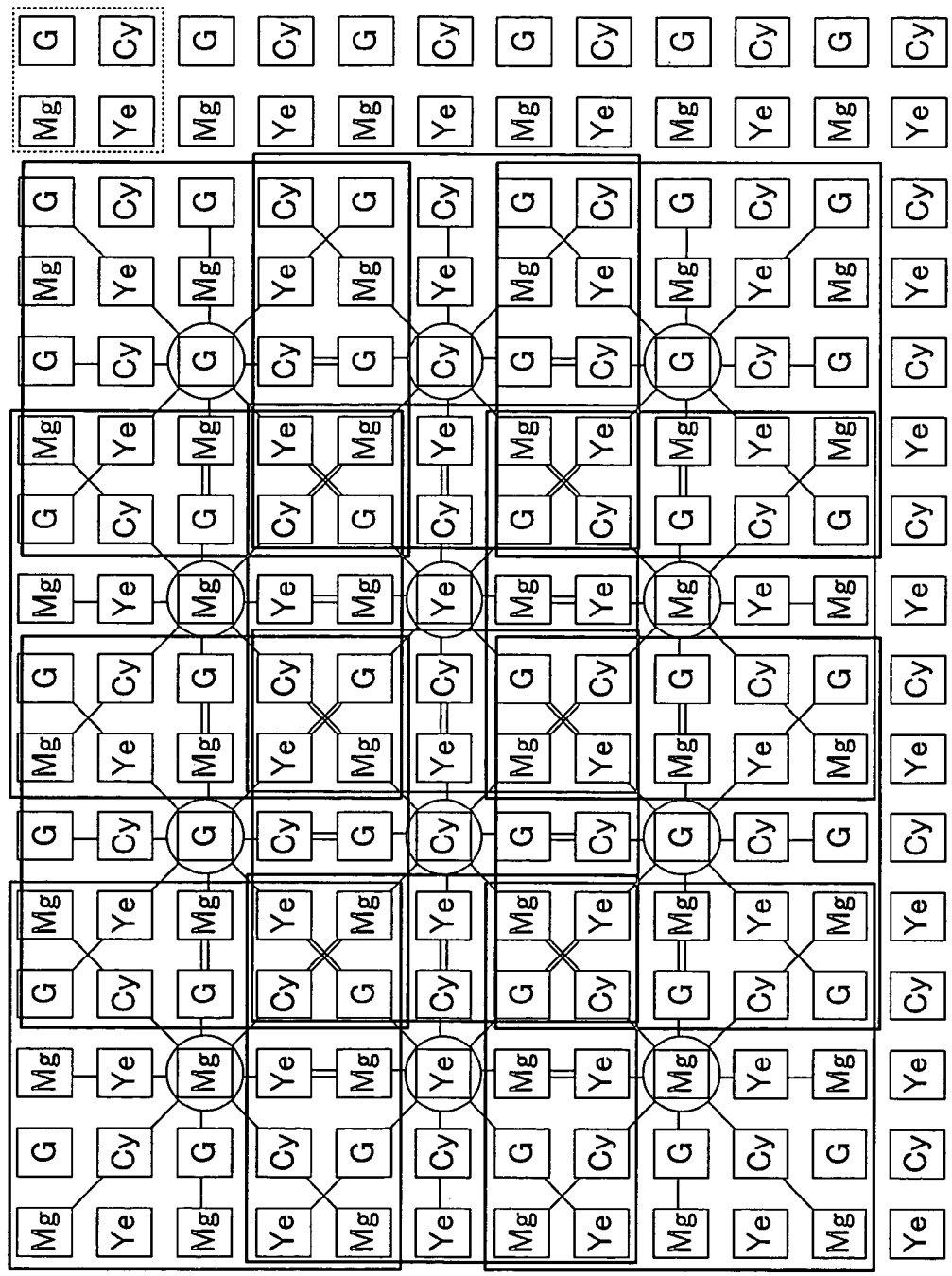
FIG. 4 is a diagram showing a pixel added pattern image with a complementary color arrangement in two rows and two columns in the first embodiment.

An imaging device having a complementary color filter array in two rows and two columns may be used. Then, the same advantages are obtained by exactly the same means. FIG. 4 shows a pixel added pattern image with a complementary color filter array in two rows and two columns applied to this embodiment. In the example shown in FIG. 4, color filters each for Cy (cyan), Mg (magenta), Ye (yellow) or G (green) are adopted.

Embodiment 2

Figure 5:
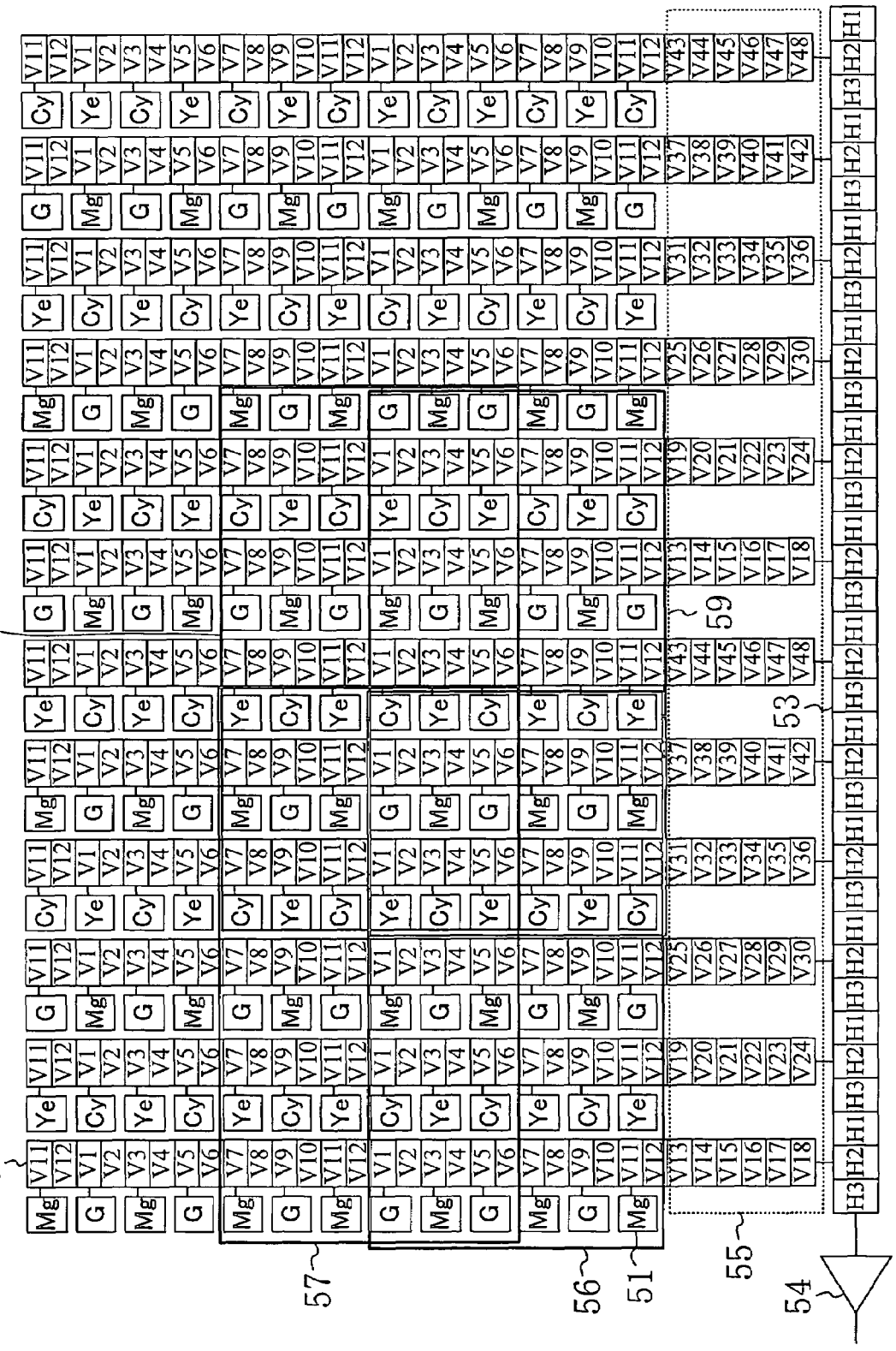
FIG. 5 is a diagram showing a configuration of a CCD solid-state imaging device according to a second embodiment of the present invention.

FIG. 5 is a diagram showing a configuration of a CCD solid-state imaging device according to a second embodiment of the inventive solid-state color imaging apparatus. Reference numeral 51 denotes a photoelectric converter and a color filter attached to the front face thereof. In this embodiment, color filters are arranged as a complementary mosaic filter array in two rows and four columns, for example. Reference numeral 52 denotes a vertical transfer stage in 12 phases constituted by V1 through V12. Reference numeral 53 denotes a horizontal transfer stage in three phases constituted by H1 through H3. Reference numeral 54 denotes an output amplifier. Reference numeral 55 denotes a vertical-horizontal transfer control section which is an extension of the 12-phase vertical transfer stage 52 constituted by V1 through V12, has its gates independently wired, and is constituted by V13 through V48. Reference numeral 56 denotes a basic unit of a pixel adding area for Mg. Reference numeral 57 denotes a basic unit of a pixel adding area for G. Reference numeral 58 denotes a basic unit of a pixel adding area for Ye. Reference numeral 59 denotes a basic unit of a pixel adding area for Cy. Each of the basic units 56 through 59 of the respective pixel adding areas is made of pixels arranged in six rows and six columns.

The vertical transfer stage 52 performs a basic transfer in a six-phase mode. For convenience in pixel addition, V constitutes 12 phases and is independently wired. First, signal charges of pixels corresponding to the photoelectric converters connected to V3 and the photoelectric converters connected to V9 are read out to the vertical transfer stage 52 by applying photoelectric-converter readout pulses to the gates of V3 and V9. The readout signal charges are transferred in a normal six-phase mode in the vertical transfer stage 52 in a direction to the bottom of the drawing sheet. When the charges of the pixels corresponding to the photoelectric converters connected to V3 in the vertical transfer stage 52 proceed by four stages to be transferred to portions under the gates of V7 and the charges of the photoelectric converters connected to V9 in the vertical transfer stage 52 proceed by four stages to be transferred to portions under the gates of V1, photoelectric-converter readout pulses are applied to the gates of V7 and V1, so that pixels connected to V7 and V1 are read out to the vertical transfer stage 52. In this manner, pixels for the same color are added together in groups of two in the vertical transfer stage 52. Then, the charges are further transferred in a normal six-phase mode in the vertical transfer stage 52 in a direction to the bottom of the drawing sheet. When the charges under the gates of V7 in the vertical transfer stage 52 proceed by four stages to be transferred to portions under the gates of V11 and the charges under the gates of V1 in the vertical transfer stage 52 proceed by four stages to be transferred to portions under the gates of V5, photoelectric-converter readout pulses are applied to the gates of V11 and V5 in the same manner, so that pixels connected to V11 and V5 are readout to the vertical transfer stage 52. In this manner, pixels for the same color are added together in groups of three in the vertical transfer stage 52.

At this time, the vertical-horizontal transfer control section 55 drives all the gates of V13 through V48 in a normal six-phase mode as in the vertical transfer stage 52, so that signal charges of the pixels connected to V3, V7 and V11 subjected to the three-pixel additions are accumulated in the vertical-horizontal transfer control section 55. Then, only V25 through V30 and V43 through V48 in the vertical-horizontal transfer control section 55 are operated by normal six-phase driving, so that only signal charges in the respective columns including V30 and V48 are transferred to the horizontal transfer stage 53. Then, the horizontal transfer stage 53 performs transfer by one line. Subsequently, only V13 through V18 and V31 through V36 in the vertical-horizontal transfer control section 55 are operated by normal six-phase driving, so that only signal charges in the respective columns including V18 and V36 are transferred to the horizontal transfer stage 53.

Thereafter, the horizontal transfer stage 53 performs four-cycle transfer in a three-phase driving mode backwards from usual, in a direction away from the output amplifier 54. Then, only V37 through V42 and V19 through V24 in the vertical-horizontal transfer control section 55 are operated by normal six-phase driving. Accordingly, only signal charges in respective columns including V42 and V24 are transferred to the horizontal transfer stage 53 and are added to signal charges for the respective same colors in the horizontal transfer stage 53. In this manner, signal charges of pixels for the same color are added together in groups of a total of six in the horizontal transfer stage 53.

Further, the horizontal transfer stage 53 performs two-cycle transfer in a normal three-phase driving mode, and then all the vertical gates of V1 through V48 are operated at the same time by normal six-phase driving in one cycle, so that signal charges of the next line are accumulated in the vertical-horizontal transfer control section 55.

Then, only V25 through V30 and V43 through V48 in the vertical-horizontal transfer control section 55 are operated by normal six-phase driving, so that only signal charges in the respective columns including V30 and V48 are transferred to the horizontal transfer stage 53. In this manner, signal charges of pixels for the same color are added together in groups of a total of nine in the horizontal transfer stage 53. Subsequently, the horizontal transfer stage 53 is operated by normal three-phase driving, so that the solid-state imaging device outputs signals in which pixels are added together in groups of nine, via the output amplifier 54.

The foregoing series of operation is repeated so that the solid-state imaging device outputs signals in which pixels are added together in groups of nine with respect to the next line.

As is apparent from the foregoing description, all the nine pixels for Mg in the Mg pixel adding area unit 56 are added together, all the nine pixels for Cy in the Cy pixel adding area unit 59 are added together, all the nine pixels for G in the G pixel adding area unit 57 are added together, and all the nine pixels for Ye in the Ye pixel adding area unit 58 are added together. Then, the resultant pixels are output.

Figure 6:
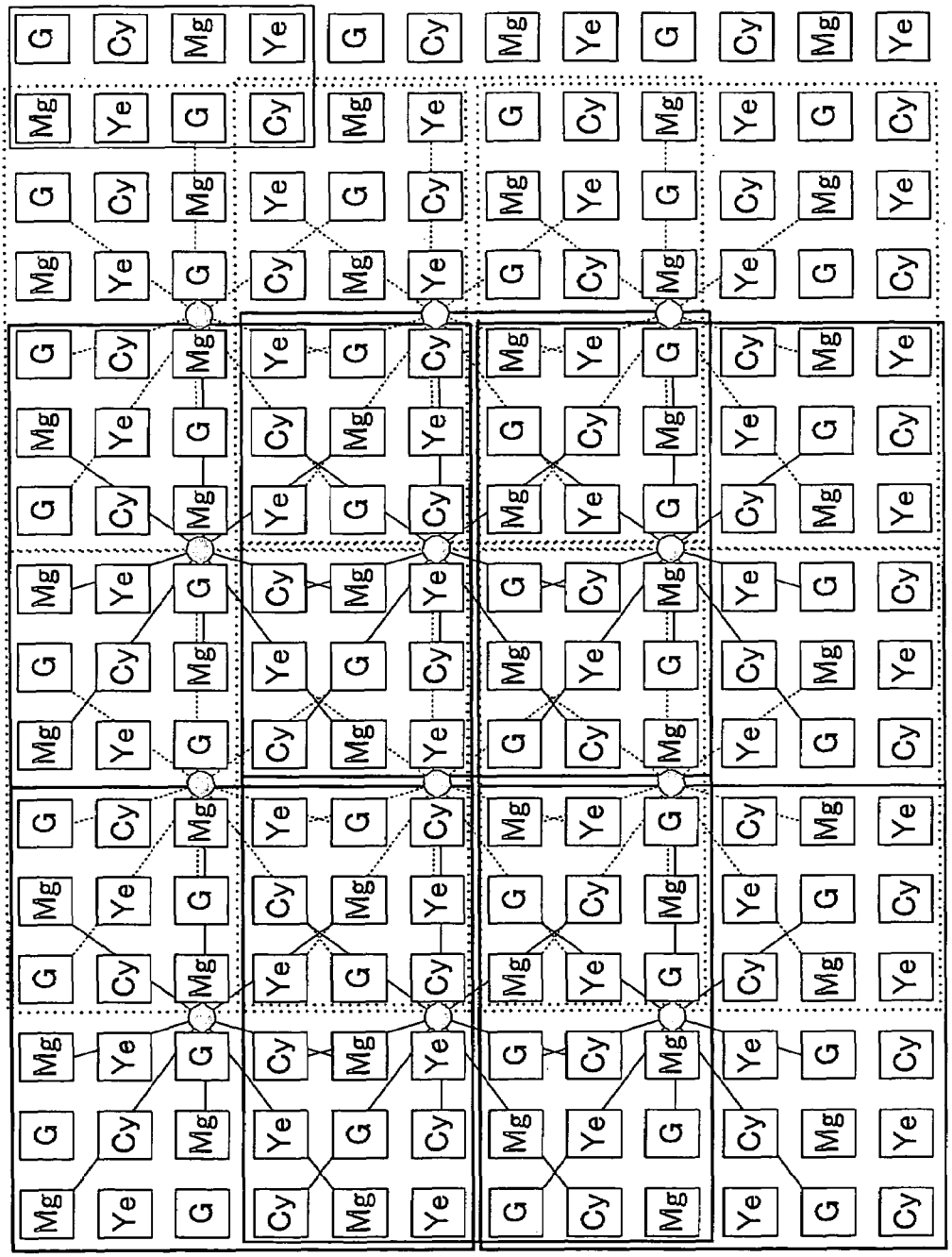
FIG. 6 is a diagram showing a pixel added pattern image with a complementary color arrangement in four rows and two columns in the second embodiment.

If the solid-state imaging device of this embodiment is rotated 90°, the scanning direction for the device output is also changed 90°, but this rotated solid-state imaging device can utilize the filter array in four rows and two columns of the first solid-state color imaging apparatus. FIG. 6 shows a pixel added pattern image in four rows and two columns which is output with this technique.

As shown in FIG. 6, pixel adding area basic units are arranged regularly, overlapping with each other in three pixels in each direction. In addition, pixels as a result of the nine-pixel additions are also arranged regularly in two dimensions to form a pattern exactly vertical inversion of the original color filter array, so that camera processing can be performed by simply devising signal processing. Further, it is also shown that the percentage of utilized pixels is 100%.

If the CCD solid-state imaging device of this embodiment is adopted as the solid-state imaging device 31 shown in FIG. 3, the output of the solid-state imaging device represents an arrangement in which pixels as a result of the nine-pixel additions are spatially arranged at a two-dimensional uniform density even in an adding mode, as shown in FIG. 6. At this time, data stored in the DRAM 36 is a 90'-rotated image in which the horizontal direction and the vertical direction are replaced with each other and the number of pixels is reduced to one-ninth. To process this data, the DRAM control block 37 performs DRAM readout in the manner of vertical scanning, which is rotated 90° with respect to the usual direction. As subsequent processes, a complementary color array process representing a mirror image with respect to the original is performed.

If V1 through V12 are changed to have the timing of a general 3:1-interlaced all-pixel readout mode, V13 through V48 are operated by general six-phase driving, the regular-interval correction is not performed on the signal processing timing and the mirror-image array process is not performed with respect to YC, only a change of the timing enables switching between the pixel adding mode and the 3:1-interlaced all-pixel readout mode.

Embodiment 3

Figure 7:
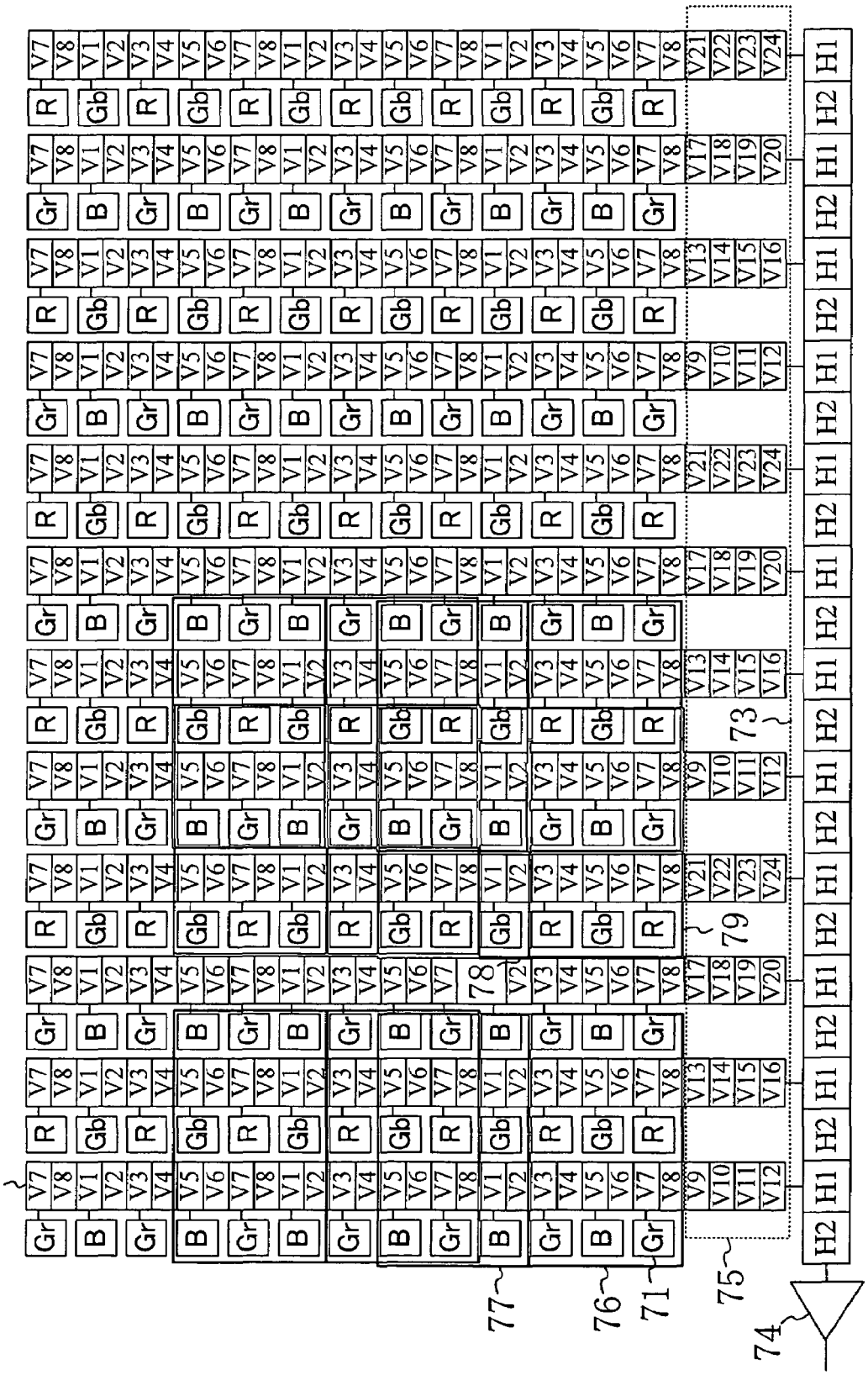
FIG. 7 is a diagram showing a configuration of a CCD solid-state imaging device according to a third embodiment of the present invention.

FIG. 7 is a diagram showing a configuration of a CCD solid-state imaging device according to a third embodiment of the inventive solid-state color imaging apparatus. Reference numeral 71 denotes a photoelectric converter and a color filter attached to the front face thereof. In this embodiment, color filters are arranged in the manner of a Bayer arrangement, for example. Reference numeral 72 denotes a vertical transfer stage in eight phases constituted by V1 through V8. Reference numeral 73 denotes a horizontal transfer stage in two phases constituted by H1 and H2. Reference numeral 74 denotes an output amplifier. Reference numeral 75 denotes a vertical-horizontal transfer control section which is an extension of the eight-phase vertical transfer stage 72 constituted by V1 through V8, has its gates independently wired, and is constituted by V9 through V24. Reference numeral 76 denotes a basic unit of a pixel adding area for Gr. Reference numeral 77 denotes a basic unit of a pixel adding area for B. Reference numeral 78 denotes a basic unit of a pixel adding area for Gb. Reference numeral 79 denotes a basic unit of a pixel adding area for R. Each of the basic units 76 through 79 of the respective pixel adding areas is made of pixels arranged in three rows and three columns.

First, the vertical transfer stage 72 performs a basic transfer in a four-phase mode. For convenience in pixel addition, V constitutes eight phases and is independently wired. First, signal charges of pixels corresponding to the photoelectric converters Gr and R connected to V3 and the photoelectric converters B and Gb connected to V5 are read out to the vertical transfer stage 72 by applying photoelectric-converter readout pulses to the gates of V3 and V5. The readout signal charges are transferred in a normal four-phase mode in the vertical transfer stage 72 in a direction to the bottom of the drawing sheet. When the charges for Gr and R in the vertical transfer stage 72 proceed by four stages to be transferred to portions under the gates of V7 and the charges for B and Gb in the vertical transfer stage 72 proceed by four stages to be transferred to portions under the gates of V1, photoelectric-converter readout pulses are applied to the gates of V7 and V1, so that pixels connected to V7 and V1 are read out to the vertical transfer stage 72. In this manner, pixels for the same color are added together in groups of two in the vertical transfer stage 72.

At this time, the vertical-horizontal transfer control section 75 drives all the gates of V9 through V24 in a normal four-phase mode as in the vertical transfer stage 72, so that signal charges for Gr and R subjected to the two-pixel additions are accumulated in the vertical-horizontal transfer control section 75. Then, only V17 through V20 and V13 through V16 in the vertical-horizontal transfer control section 75 are operated by normal four-phase driving, so that only signal charges for Gr and R in the respective columns including V20 and V16 are transferred to the horizontal transfer stage 73. Subsequently, the horizontal transfer stage 73 performs two-cycle transfer in a normal two-phase driving mode. Thereafter, only V9 through V12 and V21 through V24 in the vertical-horizontal transfer control section 75 are operated by normal four-phase driving, so that only signal charges for Gr and R in the respective columns including V12 and V24 are transferred to the horizontal transfer stage 73 and are added to signal charges for the respective same colors in the horizontal transfer stage 73. In this manner, signal charges of pixels for each of Gr and R are added together in groups of a total of four in the horizontal transfer stage 73. Further, the horizontal transfer stage 73 is operated by normal two-phase driving, so that the solid-state imaging device outputs signals for respective Gr and R in which pixels are added together in groups of four, via the output amplifier 74.

The foregoing series of operation is repeated so that the solid-state imaging device outputs signals for respective B and Gb in which pixels are added together in groups of four with respect to the next line.

Figure 8:
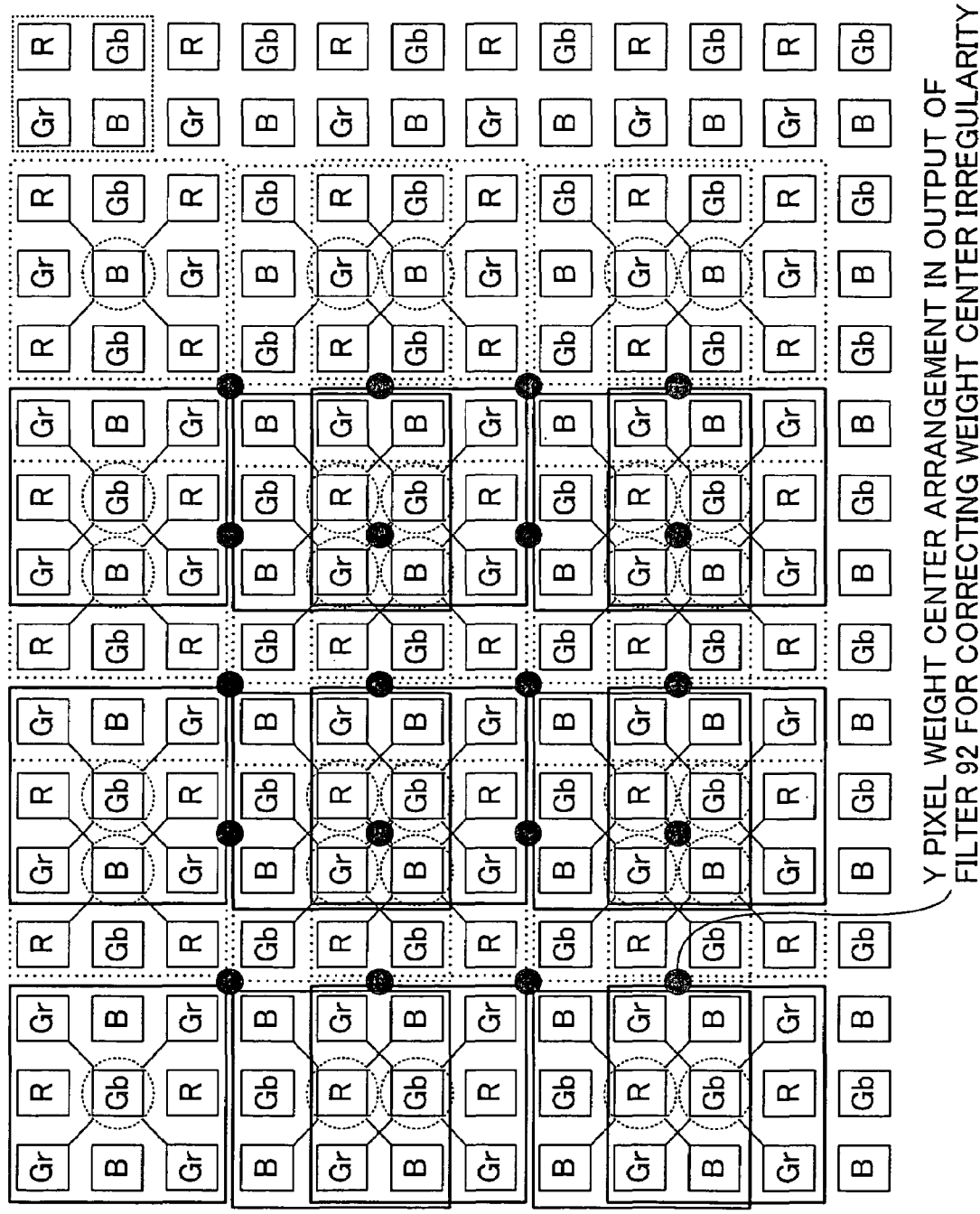
FIG. 8 is a diagram showing a pixel added pattern image in a Bayer arrangement in the third embodiment.

As is apparent from the foregoing description, all the four pixels for Gr in the Gr pixel adding area unit 76 are added together, all the four pixels for R in the R pixel adding area unit 79 are added together, all the four pixels for B in the B pixel adding area unit 77 are added together, and all the four pixels for Gb in the Gb pixel adding area unit 78 are added together. Then, the resultant pixels are output. FIG. 8 shows a pixel added pattern image which is output with this technique.

As shown in FIG. 8, the position of a resultant pixel obtained by the four-pixel addition coincides with the center of a basic unit of a pixel adding area, and basic units of pixel adding areas alternately do not overlap with each other (i.e., are adjacent to each other) and overlap with each other in two pixels in each direction, so that the resultant pixels obtained by the pixel additions are irregularly located. However, the pixel arrangement after the four-pixel additions is also a Bayer arrangement. In addition, as in the first and second embodiments, it is also shown that the percentage of utilized pixels is 100%.

In the first embodiment, a pixel adding area is set at a pixel step which is integral multiple of four, and thus the setting for the reduction of the number of pixels is limited. On the other hand, the third embodiment provides interpolation for the step in the setting in the first embodiment, and thus allows a pixel adding area to be set at a pixel step which is an integral multiple of two, resulting in the fine-step effect of reducing the number of pixels.

If the CCD solid-state imaging device shown in FIG. 7 is adopted as the solid-state imaging device 31 shown in FIG. 3, the output of the solid-state imaging device represents an arrangement in which the resultant pixels obtained by the pixel additions are spatially arranged in the manner of an ordinary Bayer arrangement even in an adding mode. At this time, the driving for addition makes the output be produced at regular intervals with respect to the timing of horizontal CCD clocks. Since data stored in the DRAM 36 represents a perfect Bayer arrangement in which the number of pixels is reduced to one-fourth, a usual Bayer process is performed as subsequent processes in terms of arrangement. The CCDRAW data in the DRAM 36 is converted into a YC signal, if required, in the YC signal processing block 38. However, the resultant-pixel density in the arrangement is non-uniform in two dimensions, and thus correction of this non-uniformity is required.

Hereinafter, a technique for correcting the non-uniformity of the resultant-pixel density in the arrangement will be described with reference to FIG. 9. Reference numeral 91 denotes a data input for receiving CCDRAW data from the DRAM 36. Reference numeral 92 denotes a filter for correcting non-uniformity in the arrangement with respect to a Y signal. Reference numeral 93 denotes a first vertical-contour-correction-signal generating filter. Reference numeral 94 denotes a second vertical-contour-correction-signal generating filter. Reference numeral 95 denotes a control signal input as a means for switching between the two vertical-contour-correction-signal generating filters. Reference numeral 96 denotes a vertical-contour-correction-signal gain input. Reference numeral 97 denotes a first horizontal-contour-correction-signal generating filter. Reference numeral 98 denotes a second horizontal-contour-correction-signal generating filter. Reference numeral 99 denotes a control signal input as a means for switching between the two horizontal-contour-correction-signal generating filters. Reference numeral 100 denotes a horizontal-contour-correction-signal gain input. Reference numeral 101 denotes a Y-signal-contour correction block. Reference numeral 102 denotes a filter for correcting non-uniformity in the arrangement with respect to a C signal.

The input 91 for receiving the CCDRAW data from the DRAM 36 is provided with the digital filter 92 represented as $1+z$ in both the horizontal direction and the vertical direction. This allows Y-signal pixels after filtering to be corrected to be regular in two dimensions as shown in FIG. 8. However, though the weight centers of Y signals are arranged regularly, the spatial frequency characteristic deteriorates greatly in the case of starting the weight-center arrangement correction for pixels apart from each other, whereas the spatial frequency characteristic less deteriorates in the case of starting the weight-center arrangement correction for pixels close to each other. Therefore, the spatial frequency characteristic needs to be corrected for every pixel. As is apparent from FIG. 8, the change in spatial frequency characteristic is repeated at every second pixel in both the horizontal direction and the vertical direction. In view of this, the first and second vertical-contour-correction-signal generating filters 93 and 94 exhibiting different characteristics are provided, a pulse which is inverted at every line is input to the control signal input 95, and the vertical-contour-correction-signal gain input 96 is switched to an optimum value at every line. In this manner, the amplitude of the change in frequency characteristic in the vertical direction is reduced. The first and second horizontal-contour-correction-signal generating filters 97 and 98 exhibiting different characteristics are provided, a pulse which is inverted at every horizontal pixel is input to the control signal input 99, and the horizontal-contour-correction-signal gain input 100 is switched to an optimum value at every horizontal pixel. In this manner, the amplitude of the change in frequency characteristic in the horizontal direction is also reduced.

In the same manner, with respect to C signals, the digital filter 102 represented as $1+2z+zz$ in both the horizontal direction and the vertical direction is provided, so that the weight-center arrangement is corrected to be regular in two dimensions. Since the C signals have a narrow necessary bandwidth, a LPF is used in the wide bandwidth of $1+2z+zz$. Accordingly, the amplitude of the change in frequency characteristic is advantageously reduced.

Figure 9:
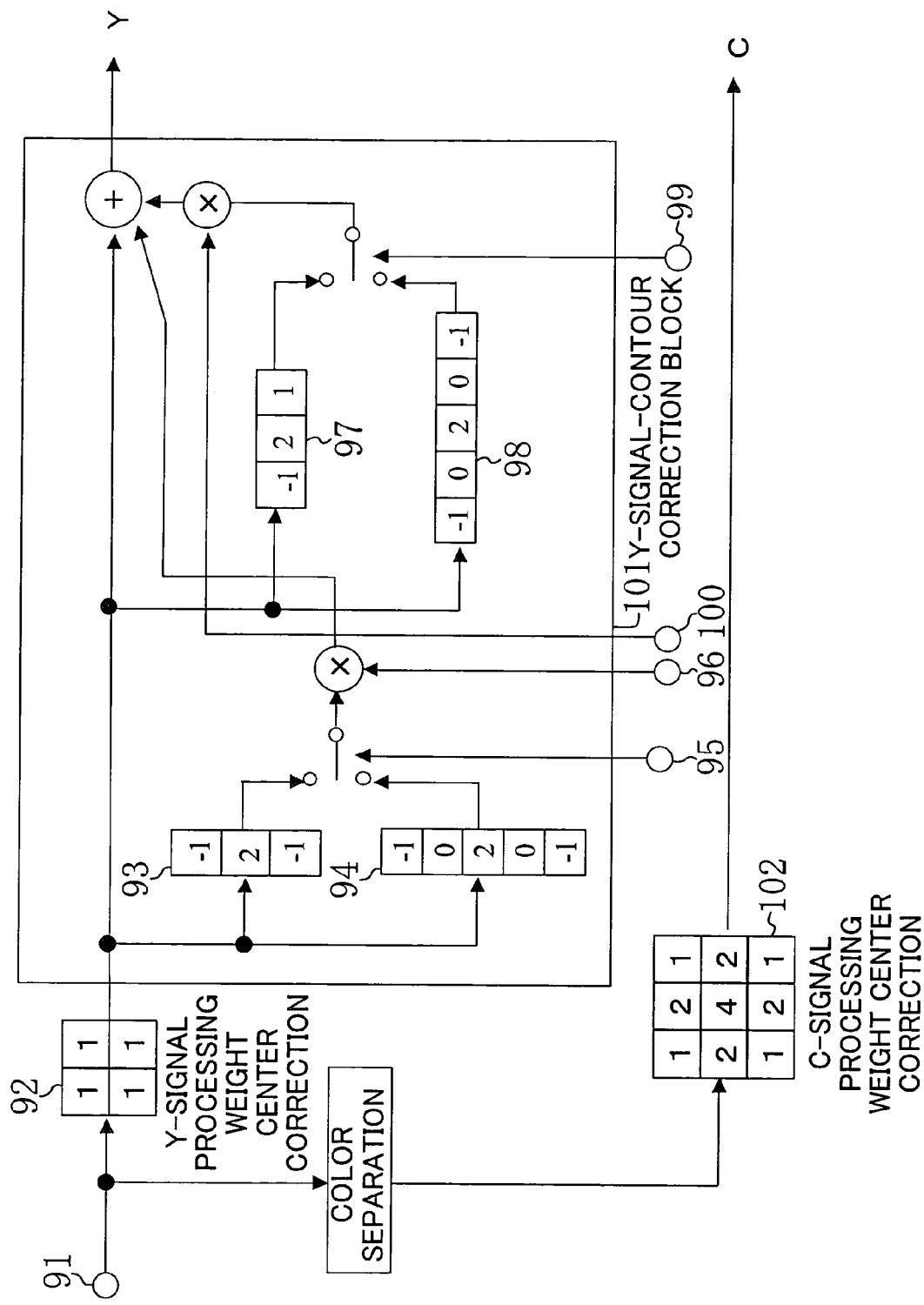
FIG. 9 is a block diagram showing YC signal processing according to the third embodiment.

As described above, in the YC signal processing block 38 shown in FIG. 9, two-dimensional irregularity in the arrangement of the weight centers of the resultant pixels obtained by the pixel additions is corrected, thus advantageously further reducing high-frequency aliasing noise. In addition, a change in two-dimensional spatial frequency characteristic is greatly suppressed at every weight-center address of the resultant pixels, thus achieving a smooth edge of Y signals.

If V1 through V8 are changed to be operated at the timing of a general 2:1-interlaced all-pixel readout mode, V9 through V24 are operated by general four-phase driving and none of the regular-interval correction and other corrections is performed on the signal processing timing, only a change of the timing enables switching between the pixel adding mode and the 2:1-interlaced all-pixel readout mode.

Figure 10:
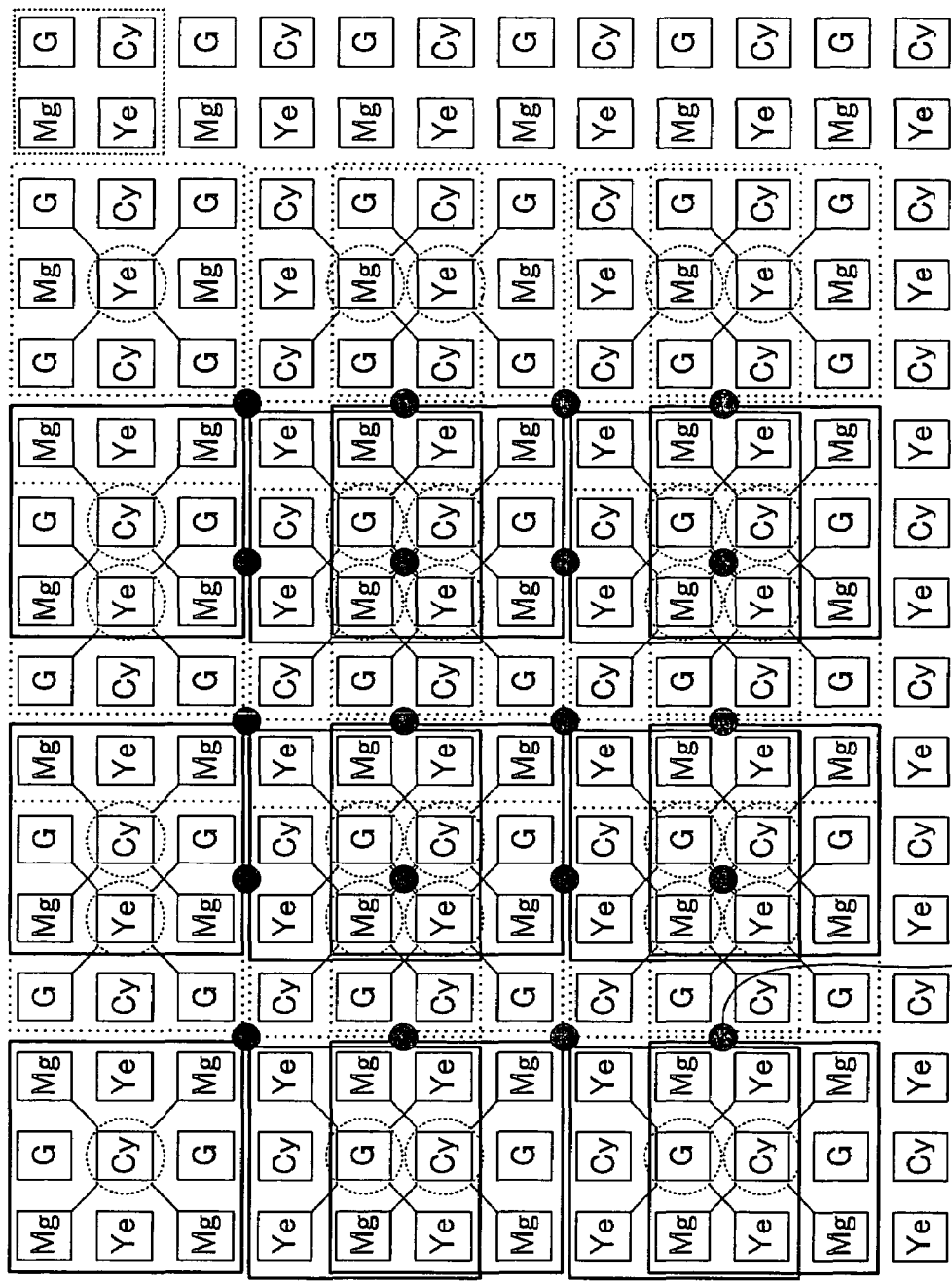
FIG. 10 is a diagram showing a pixel added pattern image with a complementary color arrangement in two rows and two columns in the third embodiment.

An imaging device having a complementary color filter array in two rows and two columns may be used. Then, the same advantages are obtained by exactly the same means. FIG. 10 shows a pixel added pattern image with complementary color filters in two rows and two columns applied to this embodiment.

Embodiment 4

Figure 11:
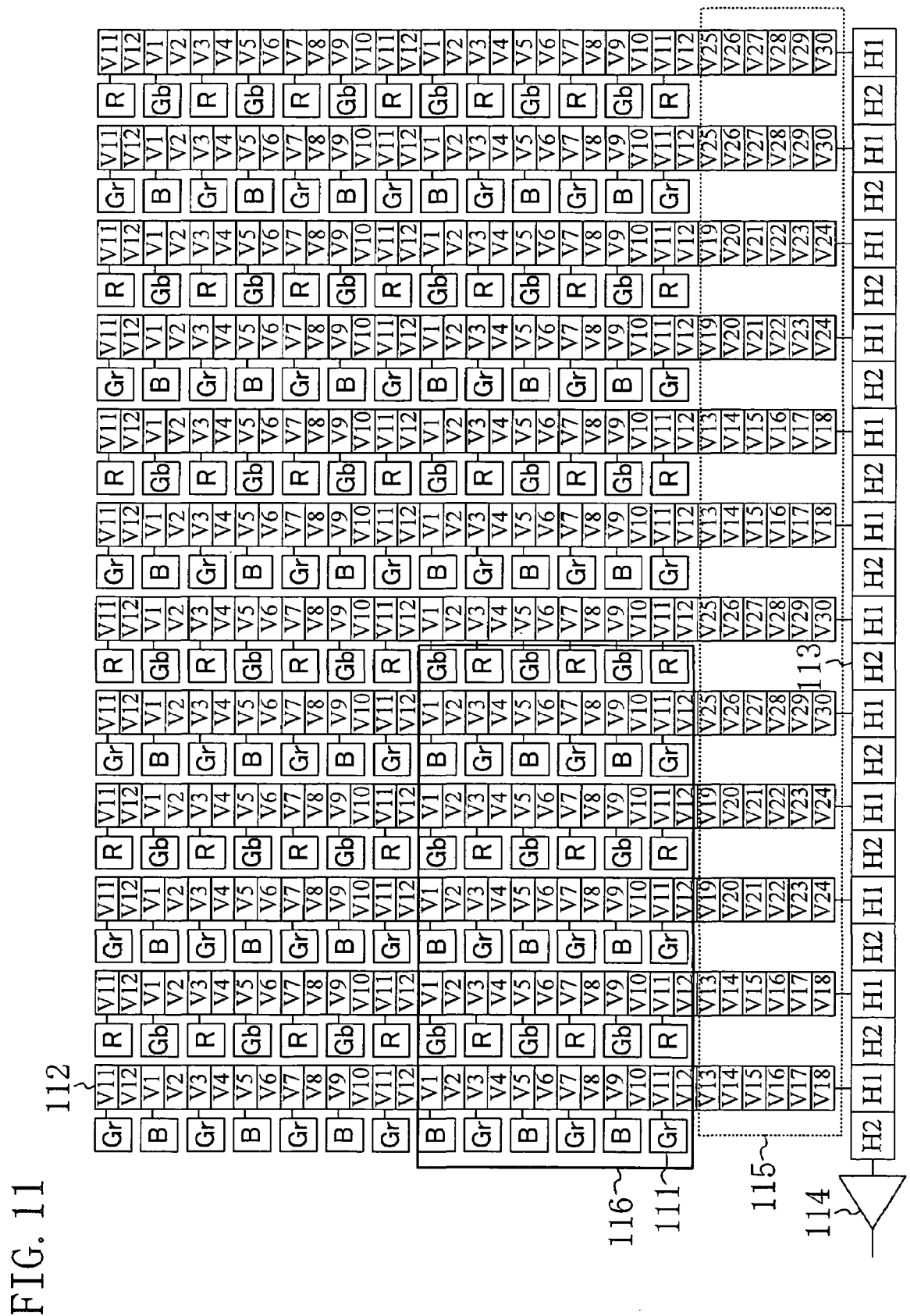
FIG. 11 is a diagram showing a configuration of a CCD solid-state imaging device according to a fourth embodiment of the present invention.

FIG. 11 is a diagram showing a configuration of a CCD solid-state imaging device according to a fourth embodiment of the inventive solid-state color imaging apparatus. Reference numeral 111 denotes a photoelectric converter and a color filter attached to the front face thereof. In this embodiment, color filters are arranged in the manner of a Bayer arrangement, for example. Reference numeral 112 denotes a vertical transfer stage in 12 phases constituted by V1 through V12. Reference numeral 113 denotes a horizontal transfer stage in two phases constituted by H1 and H2. Reference numeral 114 denotes an output amplifier. Reference numeral 115 denotes a vertical-horizontal transfer control section which is an extension of the 12-phase vertical transfer stage 112 constituted by V1 through V12, has its gates independently wired, and is constituted by V13 through V30. Reference numeral 116 denotes a basic unit of a pixel adding area which is common to all the colors. The basic unit 116 of the pixel adding area is made of pixels arranged in six rows and six columns.

The vertical transfer stage 112 performs a basic transfer in a six-phase mode. For convenience in pixel addition, V constitutes 12 phases and is independently wired. First, signal charges of pixels corresponding to the photoelectric converters Gr and R connected to V3 are read out to the vertical transfer stage 112 by applying photoelectric-converter readout pulses to the gates of V3. The readout signal charges are transferred in a normal six-phase mode in the vertical transfer stage 112 in a direction to the bottom of the drawing sheet. When the charges for Gr and R in the vertical transfer stage 112 proceed by four stages to be transferred to portions under the gates of V7, photoelectric-converter readout pulses are applied to the gates of V7 and V1, so that pixels connected to V7 and V1 are read out to the vertical transfer stage 112. In this manner, pixels for each of Gr and R are added together in groups of two in the vertical transfer stage 112. Then, the charges are further transferred in a normal six-phase mode in the vertical transfer stage 112 in a direction to the bottom of the drawing sheet. When the charges for Gr and R in the vertical transfer stage 112 proceed by four stages to be transferred to portions under the gates of V11 and the charges for B and Gb in the vertical transfer stage 112 are transferred by four stages to be transferred to portions under the gates of V5, photoelectric-converter readout pulses are applied to the gates of V11 and V5, so that pixels connected to V11 and V5 are readout to the vertical transfer stage 112. In this manner, in the vertical transfer stage 112, pixels for each of Gr and R are added together in groups of three and pixels for each of B and Gb are added together in groups of two.

At this time, the vertical-horizontal transfer control section 115 drives all the gates of V13 through V30 in a normal six-phase mode as in the vertical transfer stage 112, so that signal charges for Gr and R subjected to the three-pixel additions are accumulated in the vertical-horizontal transfer control section 115. At the same time, charges for B and Gb in the vertical transfer stage 112 proceed by four stages to be transferred to portions under the gates of V9, and photo-electric-converter readout pulses are applied to the gates of V9 in the same manner, so that pixels connected to V9 are readout to the vertical transfer stage 112. In this manner, in the vertical transfer stage 112, pixels for each of B and Gb are also added together in groups of three.

Then, only V25 through V30 in the vertical-horizontal transfer control section 115 are operated by normal six-phase driving, so that only signal charges for Gr and R in the columns including V30 are transferred to the horizontal transfer stage 113. Subsequently, the horizontal transfer stage 113 performs two-stage transfer in a normal two-phase driving mode. Then, only V19 through V24 in the vertical-horizontal transfer control section 115 are operated by normal six-phase driving, so that only signal charges for Gr and R in the columns including V24 are transferred to the horizontal transfer stage 113 and are added to signal charges for the respective same colors in the horizontal transfer stage 113. In this manner, signal charges of pixels for each of Gr and R are added together in groups of a total of six in the horizontal transfer stage 113. Subsequently, the horizontal transfer stage 113 performs two-stage transfer in a normal two-phase driving mode, and then only V13 through V18 in the vertical-horizontal transfer control section 115 are operated by normal six-phase driving, so that only signal charges for Gr and R in the columns including V18 are transferred to the horizontal transfer stage 113 and are added to signal charges for the respective same colors in the horizontal transfer stage 113. In this manner, in the horizontal transfer stage 113, signal charges of pixels for each of Gr and R are added together in groups of a total of nine. Subsequently, the horizontal transfer stage 113 is operated by normal two-phase driving, so that the solid-state imaging device outputs signals for respective Gr and R each of which corresponds to one line and in which pixels are added together in groups of nine, via the output amplifier 114.

The foregoing series of operation is repeated so that the solid-state imaging device outputs signals for respective B and Gb in which pixels are added together in groups of nine.

Figure 12:
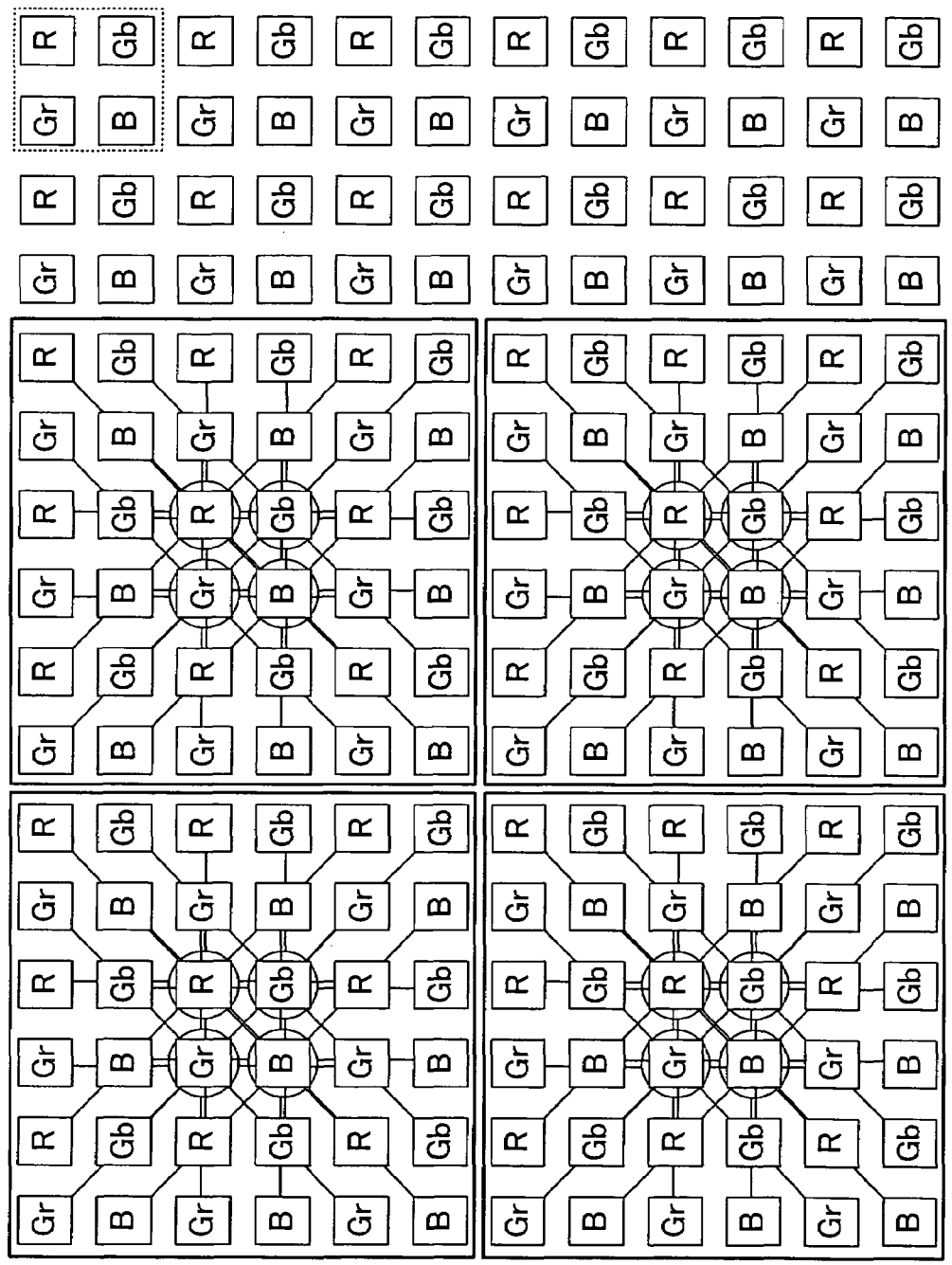
FIG. 12 is a diagram showing a pixel added pattern image in a Bayer arrangement in the fourth embodiment.

As is apparent from the foregoing description, an output in which all the nine pixels for Gr are added together, all the nine pixels for R are added together, all the nine pixels for B are added together and all the nine pixels for Gb are added together in the pixel adding area unit 116 is achieved. FIG. 12 shows a pixel added pattern image which is output with this technique.

As shown in FIG. 12, all the colors corresponding to the pixels subjected to the nine-pixel additions in the pixel adding area 116 are output from the solid-state imaging device. In this embodiment, it is also shown that the percentage of utilized pixels is 100%.

If the CCD solid-state imaging device shown in FIG. 11 is adopted as the solid-state imaging device 31 shown in FIG. 3, the output of the solid-state imaging device exhibits an arrangement in which the resultant pixels for all the colors are spatially located near the center of the single pixel adding area 116 in an adding mode. At this time, data stored in the DRAM 36 represents an arrangement in which the number of pixels is reduced to one-ninth and all the four colors are included in the same area. Therefore, this embodiment allows YC processing to be completed using pixels within the same area.

If V1 through V12 are changed to be operated at the timing of a general 3:1-interlaced all-pixel readout mode, V13 through V30 are operated by general six-phase driving, the regular-interval correction is not performed on the signal processing timing and a YC process is a Bayer process, only a change of the timing and simple switching between circuits enable switching between the pixel adding mode and the 3:1-interlaced all-pixel readout mode.

In this embodiment, the number of Y output pixels is reduced to one-fourth of those of the aforesaid overlapping types, and therefore this embodiment is effective in largely reducing the number of pixels.

Figure 13:
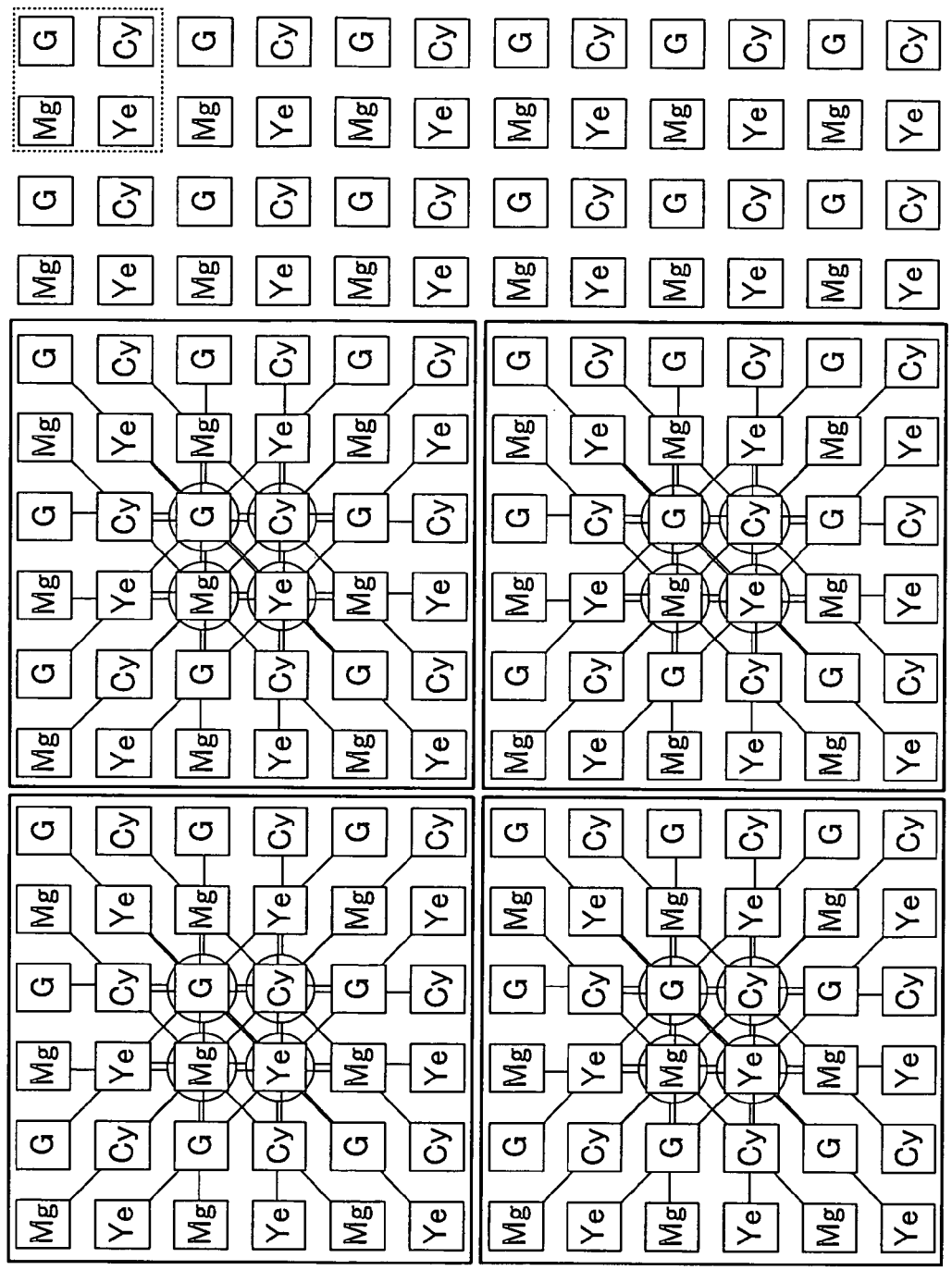
FIG. 13 is a diagram showing a pixel added pattern image with a complementary color arrangement in two rows and two columns in the fourth embodiment.

An imaging device having a complementary color filter array in two rows and two columns may be used. Then, the same advantages are obtained by exactly the same means. FIG. 13 shows a pixel added pattern image with complementary color filters arranged in two rows and two columns applied to this embodiment.

Embodiment 5

Figure 14:
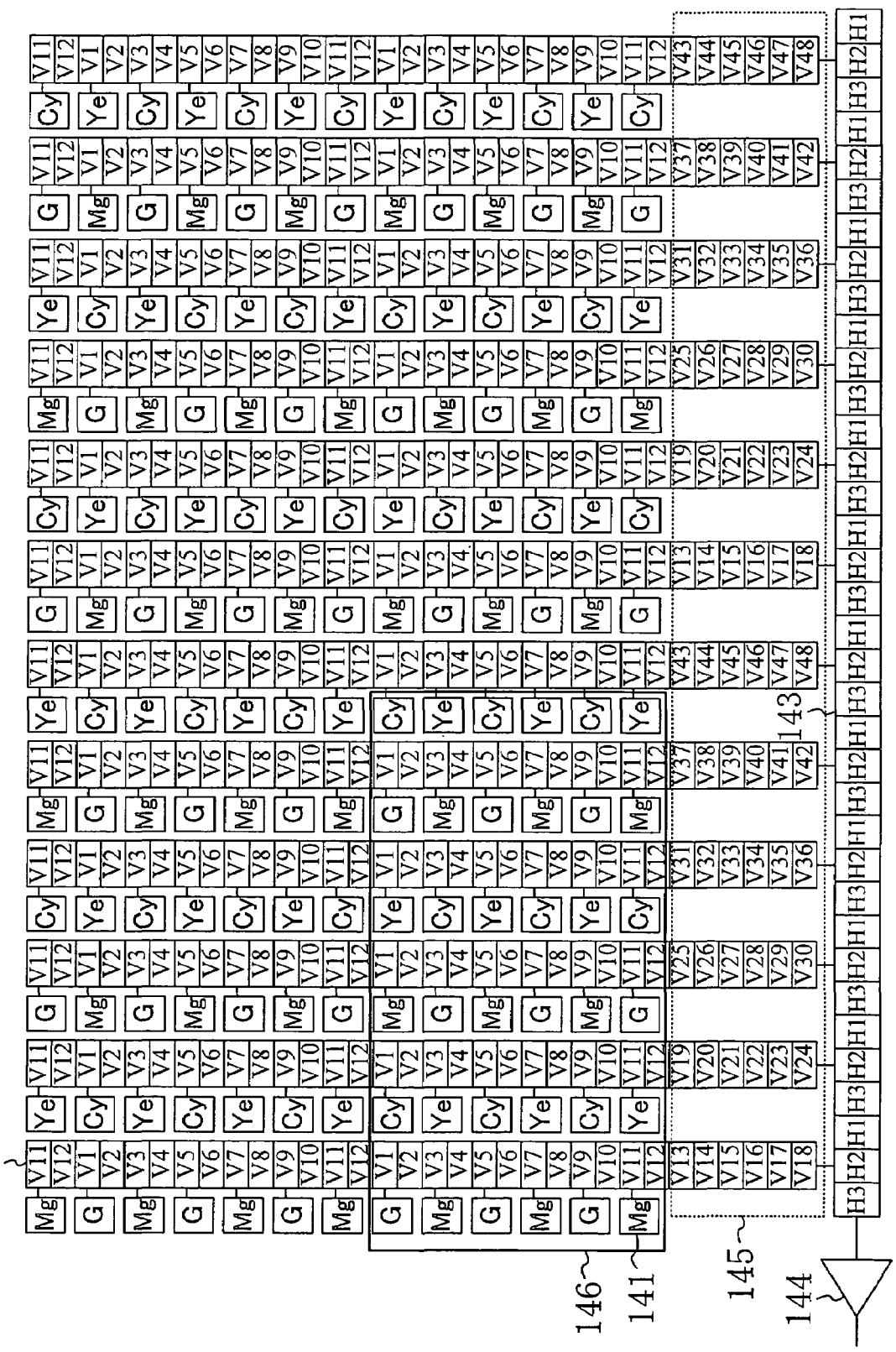
FIG. 14 is a diagram showing a configuration of a CCD solid-state imaging device according to a fifth embodiment of the present invention.

FIG. 14 is a diagram showing a configuration of a CCD solid-state imaging device according to a fifth embodiment of the inventive solid-state color imaging apparatus. Reference numeral 141 denotes a photoelectric converter and a color filter attached to the front face thereof. In this embodiment, color filters are arranged as a complementary mosaic filter array in two rows and four columns, for example. Reference numeral 142 denotes a vertical transfer stage in 12 phases constituted by V1 through V12. Reference numeral 143 denotes a horizontal transfer stage in three phases constituted by H1 through H3. Reference numeral 144 denotes an output amplifier. Reference numeral 145 denotes a vertical-horizontal transfer control section which is an extension of the 12-phase vertical transfer stage 142 constituted by V1 through V12, has its gates independently wired, and is constituted by V13 through V48. Reference numeral 146 denotes a basic unit of a pixel adding area for all the colors. The basic unit 146 of the pixel adding area is made of pixels arranged in six rows and six columns.

The vertical transfer stage 142 performs a basic transfer in a six-phase mode. For convenience in pixel addition, V constitutes 12 phases and is independently wired. First, signal charges of pixels corresponding to the photoelectric converters connected to V3 are read out to the vertical transfer stage 142 by applying photoelectric-converter readout pulses to the gates of V3. The readout signal charges are transferred in a normal six-phase mode in the vertical transfer stage 142 in a direction to the bottom of the drawing sheet. When the charges of the pixels connected to V3 in the vertical transfer stage 142 proceed by four stages to be transferred to portions under the gates of V7, photoelectric-converter readout pulses are applied to the gates of V7 and V1, so that pixels connected to V7 and V1 are read out to the vertical transfer stage 142. In this manner, pixels connected to V3 and V7 are added together in groups of two in the vertical transfer stage 142. Then, the charges are further transferred in a normal six-phase mode in the vertical transfer stage 142 in a direction to the bottom of the drawing sheet. When the charges of the pixels connected to V3 and V7 in the vertical transfer stage 142 proceed by four stages to be transferred to portions under the gates of V11 and the charges of the pixels connected to V1 in the vertical transfer stage 142 proceed by four stages to be transferred to portions under the gates of V5, photoelectric-converter readout pulses are applied to the gates of V11 and V5 in the same manner, so that pixels connected to V11 and V5 are readout to the vertical transfer stage 142. In this manner, pixels for the same color connected to each of V3, V7 and V11 are added together in groups of three and pixels for the same color connected to each of V1 and V5 are added together in groups of two in the vertical transfer stage 142.

At this time, the vertical-horizontal transfer control section 145 drives all the gates of V13 through V48 in a normal six-phase mode as in the vertical transfer stage 142, so that signal charges of pixels connected to V3, V7 and V11 subjected to the three-pixel additions are accumulated in the vertical-horizontal transfer control section 145. At the same time, charges of the pixels connected to V1 and V5 in the vertical transfer stage 142 proceed by four stages to be transferred to portions under the gates of V9 and photoelectric-converter readout pulses are applied to the gates of V9 in the same manner, so that pixels connected to V9 are readout to the vertical transfer stage 142. In this manner, pixels for the same color connected to each of V1, V5 and V9 are added together in groups of three in the vertical transfer stage 142.

Then, only V13 through V18 and V19 through V24 in the vertical-horizontal transfer control section 145 are operated by normal six-phase driving, so that only signal charges in the respective columns including V18 and V24 are transferred to the horizontal transfer stage 143. Subsequently, the horizontal transfer stage 143 performs four-cycle transfer by three-phase driving backwards from usual, in a direction away from the output amplifier 144. Then, all the gates of V13 through V48 in the vertical-horizontal transfer control section 145 are operated by normal six-phase driving as the gates of V1 through V12, so that signal charges in the respective columns including V30, V36, V42 and V48 are transferred to the horizontal transfer stage 143. As a result, G corresponding to three pixels is accumulated in part of the horizontal transfer stage 143 connected to V30, Cy corresponding to three pixels is accumulated in part of the horizontal transfer stage 143 connected to V36, Cy as a result of addition corresponding to six pixels is accumulated in part of the horizontal transfer stage 143 connected to V42, and Ye as a result of addition corresponding to six pixels is accumulated in part of the horizontal transfer stage 143 connected to V48.

Thereafter, the horizontal transfer stage 143 performs two-cycle transfer in a three-phase mode backwards from usual, in a direction away from the output amplifier 144. Then, only V37 through V42 and V43 through V48 in the vertical-horizontal transfer control section 145 are operated by normal six-phase driving. Accordingly, only signal charges in respective columns including V42 and V48 are transferred to the horizontal transfer stage 143 and are added to signal charges for the respective same colors in the horizontal transfer stage 143. In this manner, signal charges corresponding to pixels for the same color are added together in groups of a total of six in the horizontal transfer stage 143.

Further, the horizontal transfer stage 143 performs four-cycle transfer in a normal three-phase driving mode in a direction to the output amplifier 144, and then all the gates of V13 through V18, V19 through V24, V25 through V30 and V31 through V36 are operated at the same time by normal six-phase driving in one cycle, so that signal charges of pixels for the same color are added together in groups of a total of nine in the horizontal transfer stage 143.

Subsequently, the horizontal transfer stage 143 is operated by normal three-phase driving, so that the solid-state imaging device outputs signals in which pixels are added together in groups of nine, via the output amplifier 144.

The foregoing series of operation is repeated so that the solid-state imaging device outputs signals in which pixels are added together in groups of nine with respect to the next line.

As is apparent from the foregoing description, an output in which all the nine pixels for Mg are added together, all the nine pixels for Cy are added together, all the nine pixels for G are added together and all the nine pixels for Ye are added together in the pixel adding area unit 146 common to all the colors is achieved.

If the solid-state imaging device of this embodiment is rotated 90°, the scanning direction for the device output is also changed 90°, but this rotated solid-state imaging device can utilize the filter array in four rows and two columns in the second solid-state color imaging apparatus.

Figure 15:
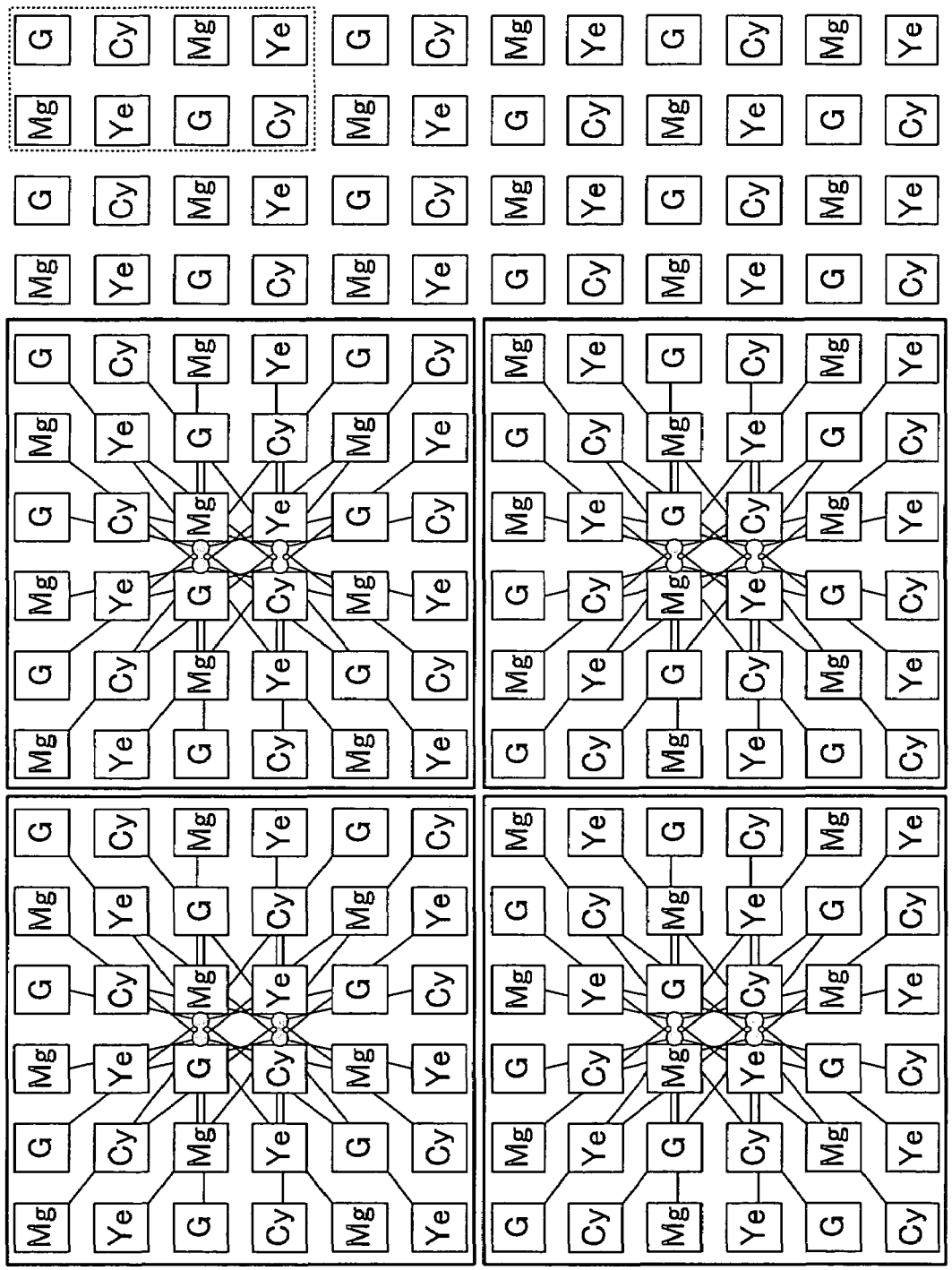
FIG. 15 is a diagram showing a pixel added pattern image with a complementary color arrangement in four rows and two columns in the fifth embodiment.

FIG. 15 shows a pixel added pattern image in four rows and two columns which is output with this technique.

As shown in FIG. 15, all the colors corresponding to the pixels subjected to the nine-pixel additions in the pixel adding area unit 146 are output from the solid-state imaging device. In this embodiment, it is also shown that the percentage of utilized pixels is 100%.

If the CCD solid-state imaging device of this embodiment is adopted as the solid-state imaging device 31 shown in FIG. 3, the output of the solid-state imaging device exhibits an arrangement in which the resultant pixels for all the colors are spatially located near the center of the pixel adding area unit 146 in an adding mode. At this time, data stored in the DRAM 36 represents an arrangement in which the number of pixels is reduced to one-ninth and all the four colors are included in the same area. Therefore, this embodiment allows YC processing to be completed with pixels in the same area.

If V1 through V12 are changed to be operated at the timing of a general 3:1-interlaced all-pixel readout mode, V13 through V48 are operated by general six-phase driving, the regular-interval correction is not performed on the signal processing timing, and the YC process is performed using a complementary mosaic filter array which is the original color filter array, only a change of the timing and simple switching between circuits enable switching between the pixel adding mode and the 3:1-interlaced all-pixel readout mode.

In this embodiment, the number of Y output pixels is one-fourth of those of the aforesaid overlapping types, and therefore this embodiment is effective in reducing the number of pixels to a required number while maintaining high image quality.

What is claimed is:
1. A solid-state color imaging apparatus comprising:
a solid-state imaging device including a plurality of photoelectric converters arranged in an array and color filters attached to front faces of the respective photoelectric converters, the color filters being repeatedly arranged in two dimensions, p×q pixels (where p is a natural number and q is a natural number) in the solid-state imaging device in which p pixels are arranged in a horizontal direction and q pixels are arranged in a vertical direction forming a basic unit of a pixel adding area;

means configured to have an arrangement in which all the basic units of the pixel adding area are repeatedly arranged in two dimensions, being shifted from each other in the horizontal and vertical directions and overlapping with each other; and means for adding together all the pixels corresponding to part of the color filters for the same color in each of the basic units of the pixel adding area, wherein the color filters are repeatedly arranged in two dimensions such that two rows and two columns constitute one unit of the color filter arrangement, p×q pixels (where p=4n+1, n is a natural number, q=4m+1 and m is a natural number) in the solid-state imaging device form a basic unit of the pixel adding area, all the basic units of the pixel adding area are repeatedly arranged in two dimensions, being shifted from each other by (p+1)/2 pixels in the horizontal direction and by (q+1)/2 pixels in the vertical direction and overlapping with each other, and a pixel corresponding to one of the color filters located at the center of each of the basic units in both the horizontal and vertical directions and pixels corresponding to part of the color filters for the same color located apart from the color filter located at the center by even numbers of rows and columns are added together in each of the basic units of the pixel adding area.

2. The solid-state color imaging apparatus of claim 1, wherein the color filters are arranged in the manner of a Bayer arrangement.

3. The solid-state color imaging apparatus of claim 1, wherein the unit of the color filter arrangement in two rows and two columns represents a combination of four colors of cyan, magenta, yellow and green.

4. The solid-state color imaging apparatus of claim 1, wherein one basic unit of the pixel adding basic area is constituted by five rows and five columns.

5. A solid-state color imaging apparatus comprising:

a solid-state imaging device including a plurality of photoelectric converters arranged in an array and color filters attached to front faces of the respective photoelectric converters, the color filters being repeatedly arranged in two dimensions, p×q pixels (where p is a natural number and q is a natural number) in the solid-state imaging device in which p pixels are arranged in a horizontal direction and q pixels are arranged in a vertical direction forming a basic unit of a pixel adding area;

means configured to have an arrangement in which all the basic units of the pixel adding area are repeatedly arranged in two dimensions, being shifted from each other in the horizontal and vertical directions and overlapping with each other; and means for adding together all the pixels corresponding to part of the color filters for the same color in each of the basic units of the pixel adding area, wherein the color filters are repeatedly arranged in two dimensions in the manner that, if one direction is defined as a row and another direction perpendicular to said direction is defined as a column, four rows and two columns form one unit of the color filter arrangement, one of the color filters at the first row and the first column and one of the color filters at the third row and the second column are for the same color, one of the color filters at the first row and the second column and one of the color filters at the third row and the first column are for the same color, one of the color filters at the second row and the first column and one of the color filters at the fourth row and the second column are for the same color, and one of the color filters at the second row and the second column and one of the color filters at the fourth row and the first column are for the same color, p×q pixels (where p=4n+2, n is a natural number, q=4m+2 and m is a natural number) in the solid-state imaging device form a basic unit of the pixel adding area, all the basic units of the pixel adding area are repeatedly arranged in two dimensions, being shifted from each other by p/2 pixels in the horizontal direction and by q/2 pixels in the vertical direction and overlapping with from each other, and all the pixels corresponding to part of the color filters for a color represented by the pixel at the first row and the first column, the first row and the second column, the second row and the first column or the second row and the second column in each of the basic units of the pixel adding area in p rows and q columns are added together in the same pattern in all the basic units of the pixel adding area, and the pixels for only one color are added together in each of the basic units of the pixel adding area.

6. The solid-state color imaging apparatus of claim 5, wherein the arrangement of part of the color filters in the front two rows and two columns in the unit of the color filter arrangement in four rows and two columns represents a combination of four colors of cyan, magenta, yellow and green.

7. The solid-state color imaging apparatus of claim 5, wherein one basic unit of the pixel adding area is constituted by six rows and six columns.

8. A solid-state color imaging apparatus comprising:

a solid-state imaging device including a plurality of photoelectric converters arranged in an array and color filters attached to front faces of the respective photoelectric converters, the color filters being repeatedly arranged in two dimensions, p×q pixels (where p is a natural number and q is a natural number) in the solid-state imaging device in which p pixels are arranged in a horizontal direction and q pixels are arranged in a vertical direction forming a basic unit of a pixel adding area;

means configured to have an arrangement in which all the basic units of the pixel adding area are repeatedly arranged in two dimensions, being shifted from each other in the horizontal and vertical directions and overlapping with each other; and means for adding together all the pixels corresponding to part of the color filters for the same color in each of the basic units of the pixel adding area, wherein the color filters are repeatedly arranged in two dimensions and two rows and two columns form one unit, p×q pixels (where p=4n−1, n is a natural number, q=4m−1 and m is a natural number) in the solid-state imaging device form a basic unit of the pixel adding area, the basic unit of the pixel adding area is repeated in two dimensions, being shifted from one another by alternately (p−1)/2 pixels and (p+3)/2 pixels in the horizontal direction and by alternately (q−1)/2 pixels and (p+3)/2 pixels in the vertical direction and overlapping with one another, and all the pixels corresponding to part of the color filters located at the respective four corners in diagonal directions and corresponding to part of the color filters for the same color located apart from the pixels at the four corners by even numbers of rows and columns are added together in the basic unit of the pixel adding area.

9. The solid-state color imaging apparatus of claim 8, further comprising means for filtering an output signal from the solid-state imaging device such that the resultant pixels reduced in number and obtained by the pixel addition are arranged at a uniform density in two dimensions.

10. The solid-state color imaging apparatus of claim 8, further comprising means for alternately changing a tap coefficient or a tap number for use in digital filtering in the horizontal direction, the vertical direction, or both the horizontal and vertical directions in a cycle corresponding to one pixel included in an output from the solid-state imaging device subjected to the pixel addition, the means being provided for a digital image signal processing for converting an output signal from the solid-state imaging device into a digital luminance signal, the digital filtering being performed for generating a signal for correcting the contour of the luminance signal.

11. The solid-state color imaging apparatus of claim 8, wherein the color filters are arranged in the manner of a Bayer arrangement.

12. The solid-state color imaging apparatus of claim 8, wherein the unit of the color filter arrangement in two rows and two columns represents a combination of four colors of cyan, magenta, yellow and green.

13. The solid-state color imaging apparatus of claim 8, wherein one basic unit of the pixel adding area is constituted by four rows and four columns or eight rows and eight columns.

14. A solid-state color imaging apparatus comprising:

a solid-state imaging device including a plurality of photoelectric converters arranged in an array and color filters attached to front faces of the respective photoelectric converters, the color filters being repeatedly arranged in two dimensions in the manner that, if one direction is defined as a row and another direction perpendicular to said direction is defined as a column, four rows and two columns form one unit of the color filter arrangement, one of the color filters at the first row and the first column and one of the color filters at the third row and the second column are for the same color, one of the color filters at the first row and the second column and one of the color filters at the third row and the first column are for the same color, one of the color filters at the second row and the first column and one of the color filters at the fourth row and the second column are for the same color and one of the color filters at the second row and the second column and one of the color filters at the fourth row and the first column are for the same color, p×q pixels (where p=2n+2, n is a natural number, q=2m+2 and m is a natural number) in the solid-state imaging device in which p pixels are arranged in a horizontal direction and q pixels are arranged in a vertical direction forming one basic unit of a pixel adding area;

means for adding together all the pixels for a color represented by one of the color filters at the first row and the first column and one of the color filters at the third row and the second column in the unit of the color filter arrangement;

means for adding together all the pixels for a color represented by one of the color filters at the first row and the second column and one of the color filters at the third row and the first column in the unit of the color filter arrangement;

means for adding all the pixels for a color represented by one of the color filters at the second row and the first column and one of the color filters at the fourth row and the second column in the unit of the color filter arrangement; and means for adding all the pixels for a color represented by one of the color filters at the second row and the second column and one of the color filters at the fourth row and the first column in the unit of the color filter arrangement.

15. The solid-state color imaging apparatus of claim 14, wherein part of the color filters arranged in the front two rows and two columns in the unit constituted by four rows and the two columns represents a combination of four colors of cyan, magenta, yellow and green.

16. The solid-state color imaging apparatus of claim 14, further comprising means for switching an output from the solid-state imaging device between an output in which pixels are added together and an output in which all the pixels are independent of each other.

* * * * *